(12) United States Patent
Withrow

(10) Patent No.: US 11,148,492 B2
(45) Date of Patent: Oct. 19, 2021

(54) CABLE LOCK ADJUSTABLE VEHICLE HITCH

(71) Applicant: 1UPUSA.COM, LLC, Dickeyville, WI (US)

(72) Inventor: Ryan Withrow, Platteville, WI (US)

(73) Assignee: 1UPUSA.COM, LLC, Dickeyville, WI (US)

(*) Notice: Subject to any disclaimer, the term of this patent is extended or adjusted under 35 U.S.C. 154(b) by 352 days.

(21) Appl. No.: 16/277,155

(22) Filed: Feb. 15, 2019

(65) Prior Publication Data

US 2019/0176552 A1   Jun. 13, 2019

Related U.S. Application Data

(63) Continuation-in-part of application No. 15/827,821, filed on Nov. 30, 2017, now Pat. No. 10,603,968.

(51) Int. Cl.
| | |
|---|---|
| *B60D 1/60* | (2006.01) |
| *B60D 1/42* | (2006.01) |
| *B60D 1/52* | (2006.01) |

(52) U.S. Cl.
CPC ............... *B60D 1/60* (2013.01); *B60D 1/42* (2013.01); *B60D 1/52* (2013.01)

(58) Field of Classification Search
CPC ............... B60D 1/60; B60D 1/42; B60D 1/52
See application file for complete search history.

(56) References Cited

U.S. PATENT DOCUMENTS

| | | | | |
|---|---|---|---|---|
| 4,635,835 | A | * | 1/1987 | Cole ............... B60R 9/10 224/501 |
| 5,322,315 | A | | 6/1994 | Carsten |
| 5,727,805 | A | | 3/1998 | La Roque |
| 5,873,319 | A | * | 2/1999 | Bentley ............ B63B 21/04 114/230.2 |
| 6,070,343 | A | * | 6/2000 | Sheldon ........... E01H 5/068 172/684.5 |
| 6,406,051 | B1 | | 6/2002 | Phillips |
| 6,829,915 | B1 | * | 12/2004 | Li .................. B60D 1/60 280/507 |
| 6,835,021 | B1 | | 12/2004 | McMillan |
| 6,902,181 | B1 | | 6/2005 | Dye |
| 6,951,287 | B1 | | 10/2005 | Randazzo |

(Continued)

*Primary Examiner* — Jacob D Knutson
(74) *Attorney, Agent, or Firm* — Charles S. Sara; Erin Ella Block; DeWitt LLP

(57) ABSTRACT

A locking adjustable trailer hitch system includes a vehicle trailer hitch receiver having a receiver opening, an adjustable hitch bar that is slidably and removably received by the trailer hitch receiver, and a cable lock that is attached through the trailer hitch receiver and the hitch bar, and locked in place to secure and lock the hitch bar to the trailer hitch receiver. The hitch system further includes an anti-wobble device to secure and stabilize the hitch bar within the hitch receiver. The hitch bar can extend along the length of the hitch bar such that the distal end of the hitch bar can be positioned at an adjustable distance from the receiver. In certain embodiments, the hitch bar may include an extended slotted depression alongside one of its walls. In those embodiments, the hitch bar can extend along the length of the slotted depression such that the distal end of the hitch bar can be positioned an adjustable distance from the receiver.

18 Claims, 16 Drawing Sheets

(56) References Cited

U.S. PATENT DOCUMENTS

| | | | |
|---|---|---|---|
| 7,568,718 B1* | 8/2009 | Thomas | B60D 1/52 280/505 |
| 7,635,247 B2 | 12/2009 | Collins | |
| 7,889,062 B1* | 2/2011 | Albisa | B60D 1/60 340/431 |
| 7,909,350 B1 | 3/2011 | Landry | |
| 8,091,913 B1 | 1/2012 | White | |
| 8,226,106 B2* | 7/2012 | Hensley | B60D 1/30 280/490.1 |
| 8,262,121 B2 | 9/2012 | Beck | |
| 8,696,011 B2 | 4/2014 | Despres | |
| 8,944,516 B2 | 2/2015 | Eidsmore | |
| 9,027,950 B2 | 5/2015 | Lahn | |
| 10,759,325 B1* | 9/2020 | Polny | B60D 1/02 |
| 2007/0007782 A1* | 1/2007 | Kalous | B60D 1/60 296/1.07 |
| 2007/0080516 A1 | 4/2007 | Simmons | |
| 2008/0231029 A1* | 9/2008 | Hummel | B60R 9/06 280/769 |
| 2013/0334792 A1 | 12/2013 | Pell | |
| 2016/0001711 A1 | 1/2016 | Hughes | |

\* cited by examiner

CABLE LOCK ADJUSTABLE VEHICLE HITCH

CROSS-REFERENCE TO RELATED APPLICATION

This application is a continuation-in-part of U.S. patent application Ser. No. 15/827,821, entitled "Locking Adjustable Vehicle Hitch", filed on Nov. 30, 2017, which is hereby incorporated by reference in its entirety.

FIELD OF THE INVENTION

The present invention is directed to a cable lock and an adjustable trailer hitch system for attaching a bicycle or similar structure to a trailer hitch on a vehicle. The present invention is specifically directed to a cable lock and an adjustable trailer hitch design which allows the user to extend the hitch bar out to accommodate obstructions in the rear of the vehicle, inhibit removal of the hitch bar from the trailer hitch receiver, and utilize an anti-wobble mechanism to frictionally secure the hitch bar at any point along the trailer hitch receiver and to inhibit unnecessary movement of the hitch bar within the trailer hitch receiver.

BACKGROUND

Bicycle racks, which can be removably attached to a vehicle, are well known to art. These can take the form of racks which are typically mounted to the rear end of a vehicle by mounting straps or racks which include a trailer hitch situated at the rear of a vehicle generally in or underneath the rear bumper. In this manner, the bicycle rack includes a trailer hitch post which includes a standard hitch mechanism, known to the art, for slidably inserting and attaching the distal end of the trailer hitch post to the trailer hitch secured to the vehicle.

Current bike rack and hitch accessories allow for the unit to be locked into the receiver by passing a pin through a receiver pin hole and a trailer hitch through hole. In some instances, the bike rack or accessory may have additional holes for allowing different positions inside the receiver. This method allows for limited trailer hitch adjustability within the receiver.

When using a single or multiple through hole to secure a bike rack or hitch accessory into a receiver, this limits the number of positions allowed for the rack or accessory. As mentioned above, if a bike rack or hitch accessory needs to be located in a position that does not allow the unit hole and receiver hole to lineup, the locking feature is lost. Current art does not allow bike racks or accessories to combine locking the hitch bar to the hitch receiver along with unlimited receiver positions or the ability to adjust the hitch bar to a desired length and lock it in place.

SUMMARY OF THE INVENTION

The present invention is directed to a cable lock and a bicycle rack hitching system that does not require the standard hole or slot for locking the hitch bar to the trailer hitch receiver. The present invention allows any inserted hitch assembly of a bicycle or accessory to be adjustable, in or out of the receiver, while still being secured with at least one locking mechanism. In conjunction with the adjustability and locking, it will also include an anti-wobble mechanism.

Thus, one embodiment of the invention is directed to a cable lock, comprising a cable with a first end and a second end, wherein the first end is adapted to releasably attach to a chain loop on a vehicle hitch receiver, further wherein the second end is adapted to releasably attach to a hitch bar.

Another embodiment of the invention is a locking adjustable trailer hitch system comprising a vehicle trailer hitch receiver, an adjustable hitch bar, an anti-wobble device, and a cable lock. The vehicle trailer hitch receiver includes a receiver opening and a chain loop. The adjustable hitch bar is for attachment to the trailer hitch receiver. The hitch bar is adapted to be slidably received in the receiver opening. The hitch bar comprises a distal end, a proximal end, parallel side walls, a top wall and a bottom wall. The anti-wobble device is to secure and stabilize the hitch bar within the hitch receiver. The cable lock is to secure and lock the adjustable hitch bar to the trailer hitch receiver. The cable lock includes a cable with a first end and a second end, wherein the first end is adapted to releasably attach to a chain loop on a vehicle hitch receiver, further wherein the second end is adapted to releasably attach to a hitch bar. The hitch bar extends along the length of the hitch bar such that the proximal end of the hitch bar is positioned an adjustable distance from the receiver. The first and second ends of the cable lock are releasably connected and locked between the chain loop and the hitch bar, thereby locking and securing the trailer hitch receiver to the hitch bar.

This design will allow the bike rack and hitch accessories to be secured and locked with a cable lock while still being able to adjust the hitch bar in or out of the receiver. While including these features, it will also use an anti-wobble design to secure the unit into the receiver for stability.

The overall design uses a combination of an anti-wobble mechanism and a positive lock system to allow the accessory to be located where desired in the receiver. Without the cable lock, a positive lock does not exist and the anti-wobble must be depended on to hold the accessory in the receiver. Further without the cable lock, the hitch bar would not be locked to the hitch receiver, but only attached to the hitch receiver. This design could be used with a hitch receiver that does not have a hitch pin hole or has been damaged or modified such that the hitch pin hole does not function properly. This design could also be used with a hitch receiver and hitch bar where the hitch pin holes do not properly line up or where it is simply desired to have the hitch bar positioned at a different distance along the hitch receiver.

Another embodiment of the invention is a locking adjustable trailer hitch system comprising a vehicle trailer hitch receiver, a locking adjustable hitch bar, an anti-wobble device, and a cable lock. The vehicle trailer hitch receiver includes a receiver opening, a chain loop, and at least one hitch pin opening for placement of a locking hitch pin. The locking adjustable hitch bar is for attachment to the trailer hitch receiver, wherein the hitch bar is adapted to be slidably received in the receiver opening. The hitch bar comprises a distal end, a proximal end, parallel side walls, a top wall and a bottom wall. The hitch bar also comprises at least one extended slotted depression having a proximal end and a distal end, wherein the slotted depression is adapted to be in alignment with the hitch pin opening. The anti-wobble device is to secure and stabilize the hitch bar within the hitch receiver. The cable lock is to secure and lock the adjustable hitch bar to the trailer hitch receiver. The cable lock includes a cable with a first end and a second end, wherein the first end is adapted to releasably attach to a chain loop on a vehicle hitch receiver, further wherein the second end is adapted to releasably attach to a hitch bar. The hitch bar extends along the length of the hitch bar such that the proximal end of the hitch bar is positioned an adjustable distance from the receiver. The first and second ends of the cable lock are releasably connected and locked between the chain loop and the hitch bar, thereby locking and securing the trailer hitch receiver to the hitch bar. The locking hitch pin releasably locks the hitch bar to the receiver thereby doubly locking the hitch bar to the hitch receiver.

This design will allow the bike rack and hitch accessories to be locked with a pin, locked with the cable lock, or doubly locked while still being able to adjust the hitch bar in or out of the receiver. While including both of these features, it will also use an anti-wobble design to secure the unit into the receiver for stability.

The overall design uses a combination of an anti-wobble mechanism and a positive lock system to allow the accessory to be located where desired in the receiver. Without the pin and stopping feature and without the cable lock, a positive lock does not exist and the anti-wobble must be depended on to hold the accessory in the receiver. Further without the pin or the cable lock, the hitch bar would not be locked to the hitch receiver, but only attached to the hitch receiver.

It is possible to combine the anti-wobble and the locking pin into one mechanism.

The cable lock is used to create a positive lock between the hitch bar and the hitch receiver. The hitch bar is inserted into the hitch receiver and adjusted to the desired distance. The bolt end of the cable lock can then be threaded through the chain loop of the hitch bar and threaded through the bolt receiving hole of the hitch bar such that the chain stop cannot pass though the chain loop. The bolt will extend through the bolt receiving hole and can be releasably coupled to the bolt lock such that the bolt lock cannot pass through the bolt receiving hole. As such, the hitch bar is connected and locked to the hitch receiver.

The cable lock can be used alone to create a positive lock. The cable lock can be used in combination with an anti-wobble device such that the hitch bar can be adjustably secured in the receiver and a positive lock is provided. The cable lock can be used in combination with an anti-wobble device and a hitch bar that has an adjustable slot so that the hitch bar can be adjustably secured in the receiver and two positive locks can be provided.

The objects and advantages of the invention will appear more fully from the following detailed description of the preferred embodiment of the invention made in conjunction with the accompanying drawings.

DETAILED DESCRIPTION OF THE INVENTION

Figure 1:
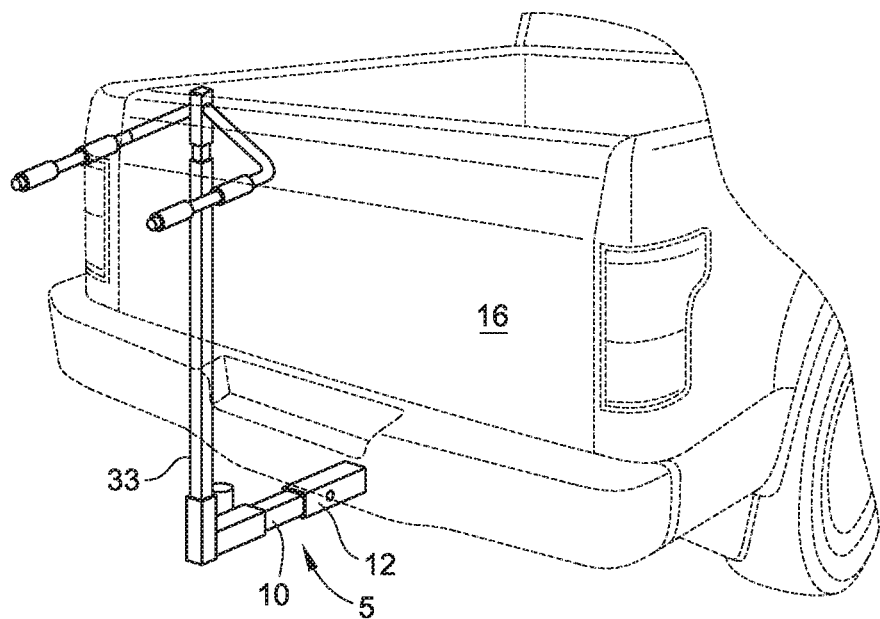
FIG. 1 is a partial perspective view of the rear end of a motor vehicle illustrating the locking adjustable vehicle hitch assembly in combination with a bicycle rack.
Figure 2:
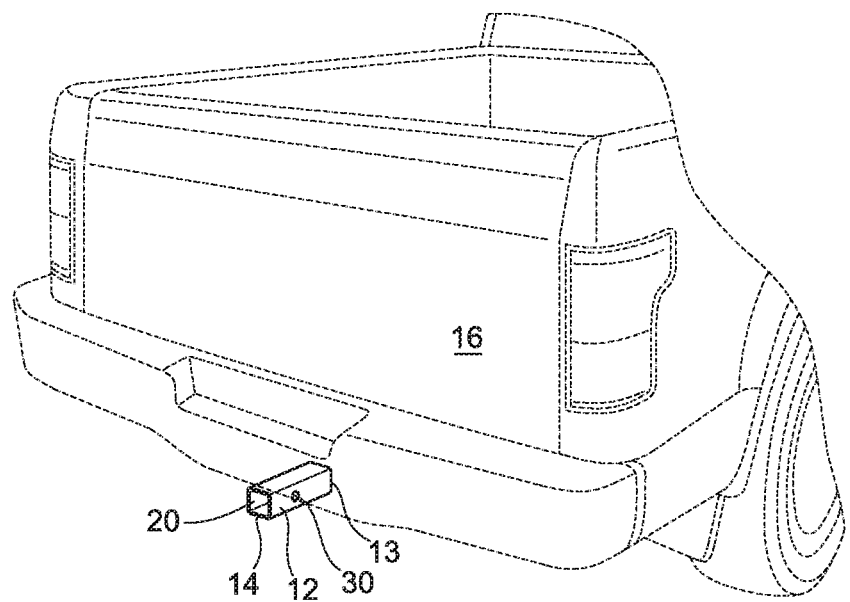
FIG. 2 is a perspective view of the rear end of the motor vehicle of FIG. 1 illustrating an embodiment of a trailer hitch receiver unit.
Figure 3:
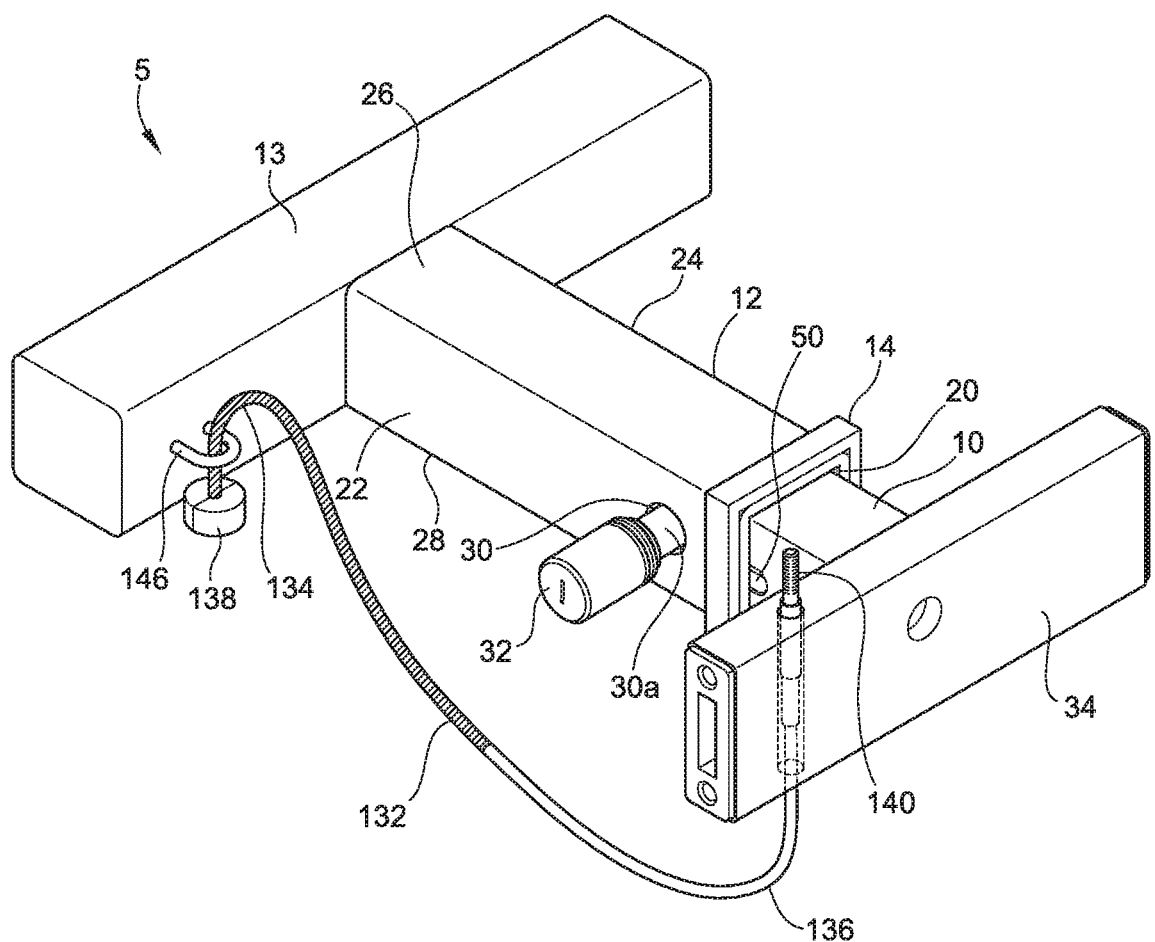
FIG. 3 is a front perspective view of a first embodiment double slot or through slot locking adjustable hitch assembly of the present invention showing the cable lock attached to the hitch receiver and the hitch bar.
Figure 4:
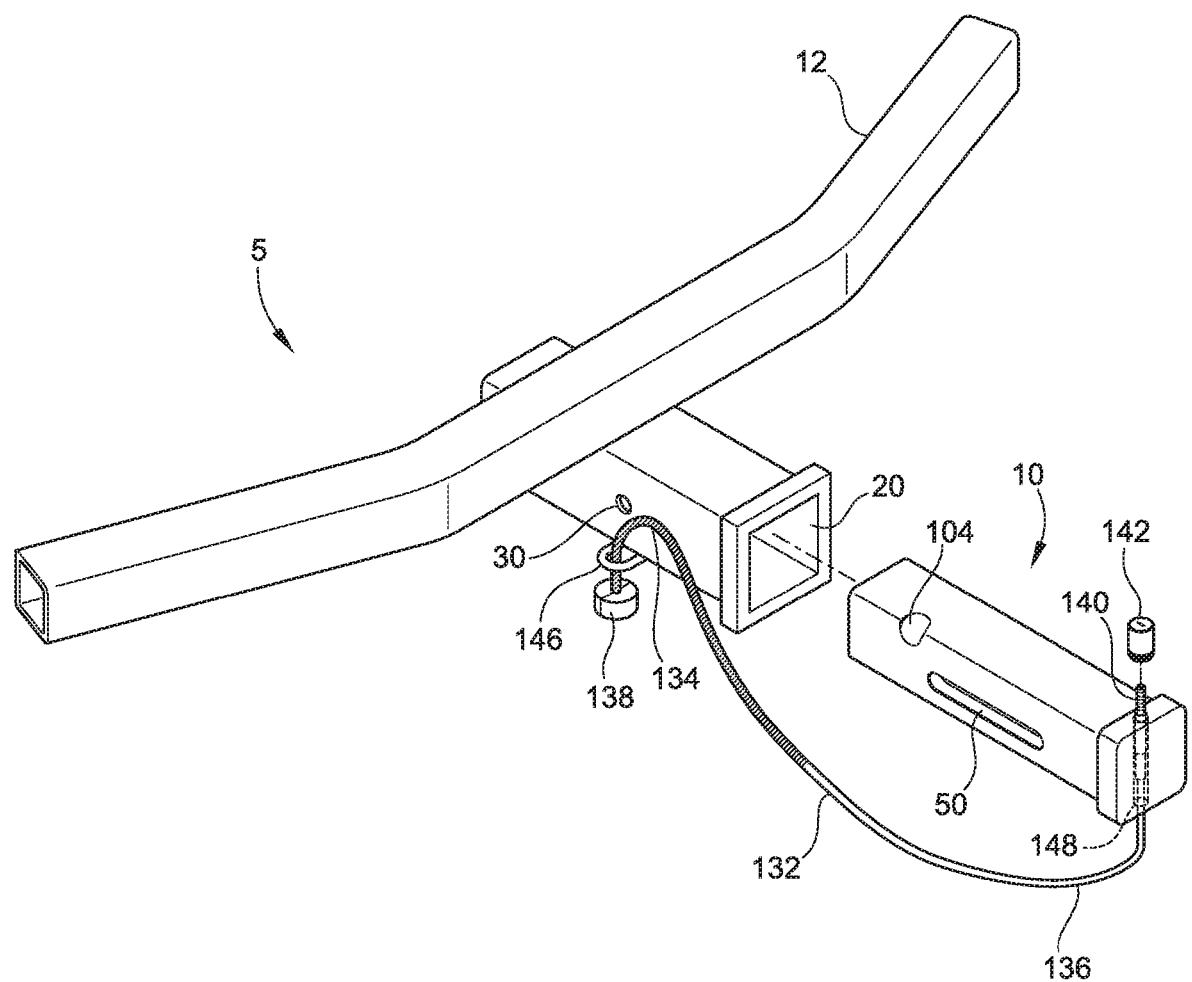
FIG. 4 is a front perspective view of a first embodiment double slot or through slot locking adjustable hitch assembly of the present invention showing the cable lock attached to the hitch receiver and the hitch bar with the releasable lock.

Referring now to the drawings and particularly FIG. 1, the present invention is directed to a trailer hitch-receiver unit 5, which includes a locking adjustable hitch bar 10 for attachment to a standard trailer hitch receiver 12 of a vehicle 16, shown in phantom. As illustrated in FIG. 2, the trailer hitch receiver 12 has a receiver opening 20 to slidably receive the hitch bar 10 to the trailer hitch receiver 12. Further, as illustrated in FIG. 3, a cable lock 130 is configured to be received by a chain loop 146 on the trailer hitch receiver 12, received through a bolt receiving hole 148 on the hitch bar 10, and be releasably locked such that the cable lock 130 secures and locks the hitch bar 10 to the trailer hitch receiver 12. Those skilled in the art will appreciate that various alternative hitch-receiver units may be employed without departing from the invention as claimed.

Figure 5:
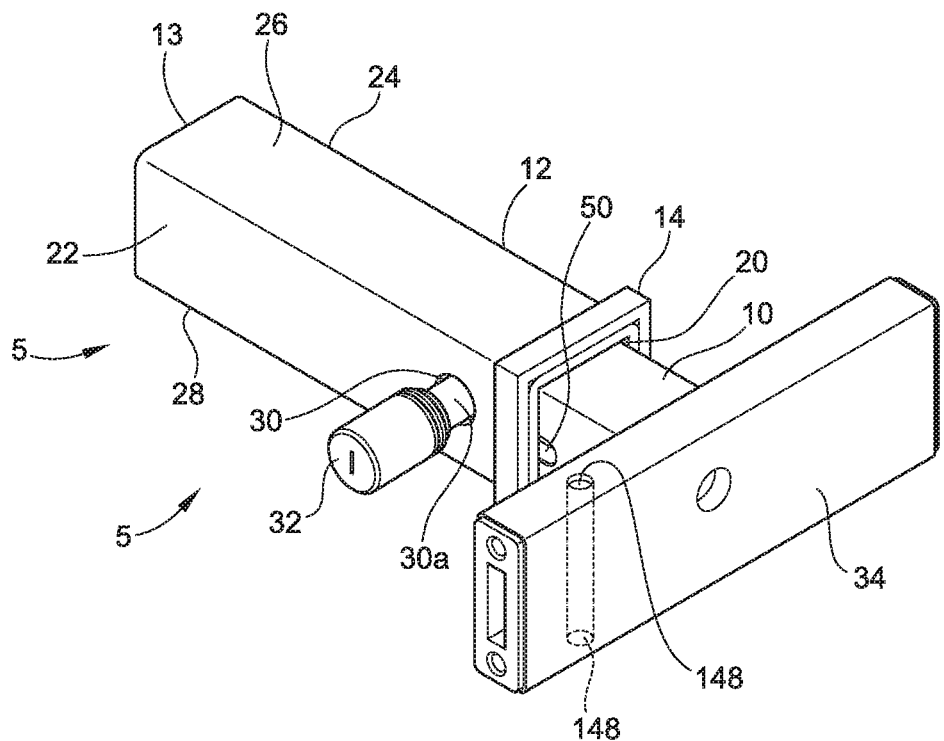
FIG. 5 is a front perspective view of a first embodiment double slot or through slot locking adjustable trailer hitch assembly of the present invention.
Figure 6:
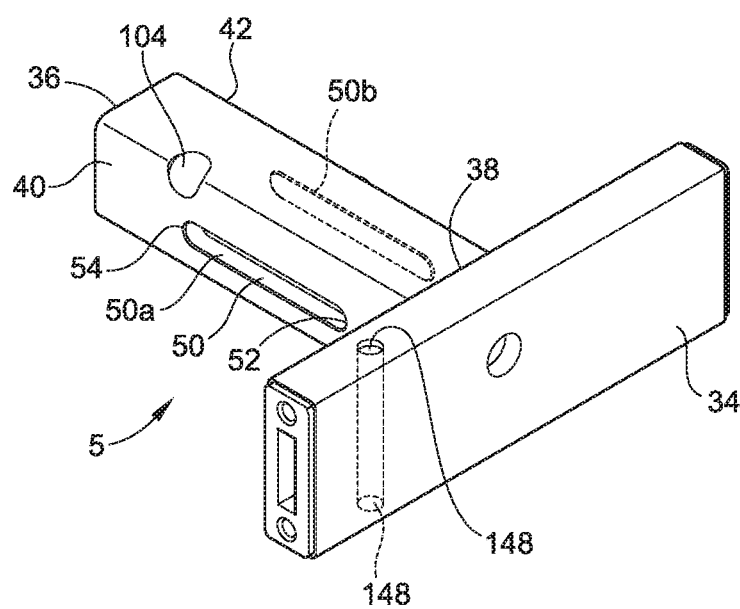
FIG. 6 is a front perspective view of the hitch bar of FIG. 5.
Figure 7:
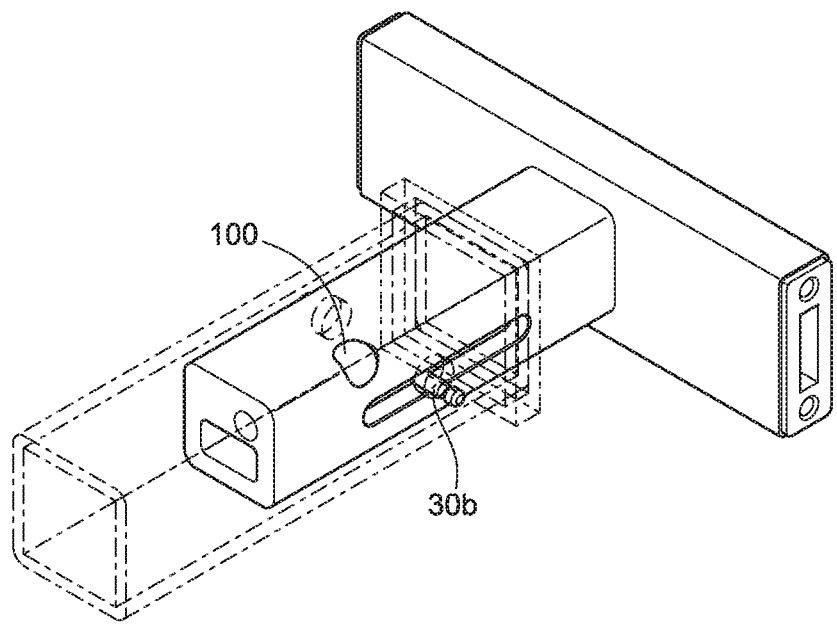
FIG. 7 is a rear perspective view of the locking adjustable trailer hitch assembly of FIG. 5.

Hitch Receiver 12:

As illustrated in FIG. 5, the trailer hitch receiver opening 20 is formed within the receiver 12 by parallel side walls 22, 24 spaced by a top wall 26 and bottom wall 28. The receiver 12 has a proximal end 13 attached to the vehicle 16 and a distal end 14. The receiver 12 has an opening 20 at the distal end 14 as illustrated in FIG. 2. The opening 20 is usually available in the following sizes: 1¼", 2", 2½" and 3", although other sizes can be contemplated. This design is not specific to size, but rather is available for all. The hitch receiver 12 is typically made of square metal tubing with the previous dimensions being the inside dimension. As will be described in detail below, in some embodiments, the receiver 12 will have at least one and sometimes multiple through hitch pin openings 30 typically placed on the side walls 22, 24 of the receiver 12. The hitch pin openings 30 allows for the placement of a hitch pin 32.

Figure 16:
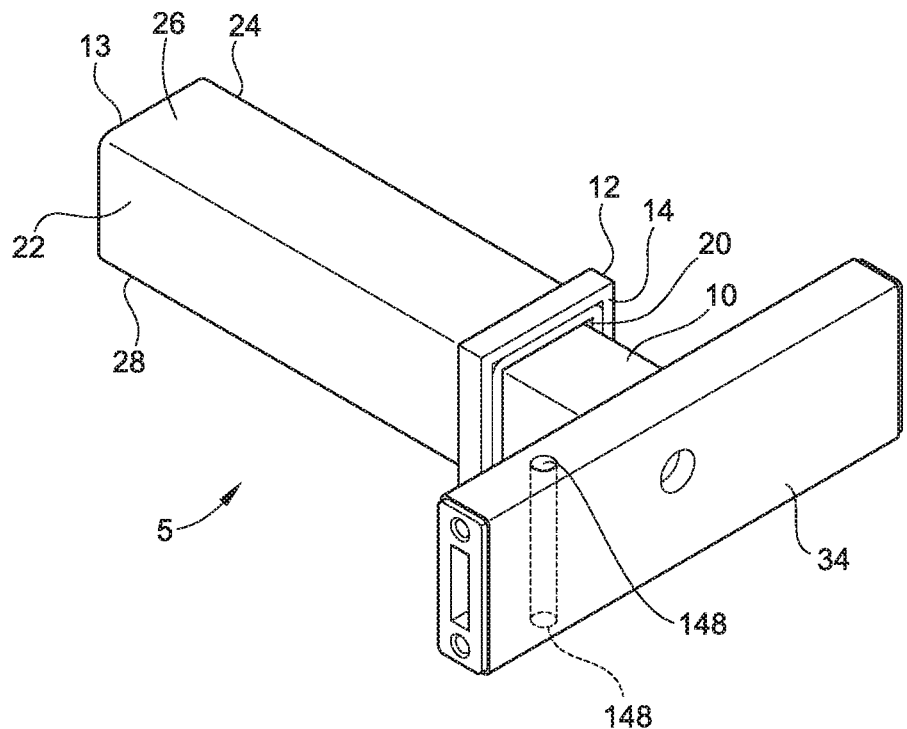
FIG. 16 is a front perspective view of an embodiment of the locking adjustable hitch assembly of the present invention with no slot.
Figure 17:
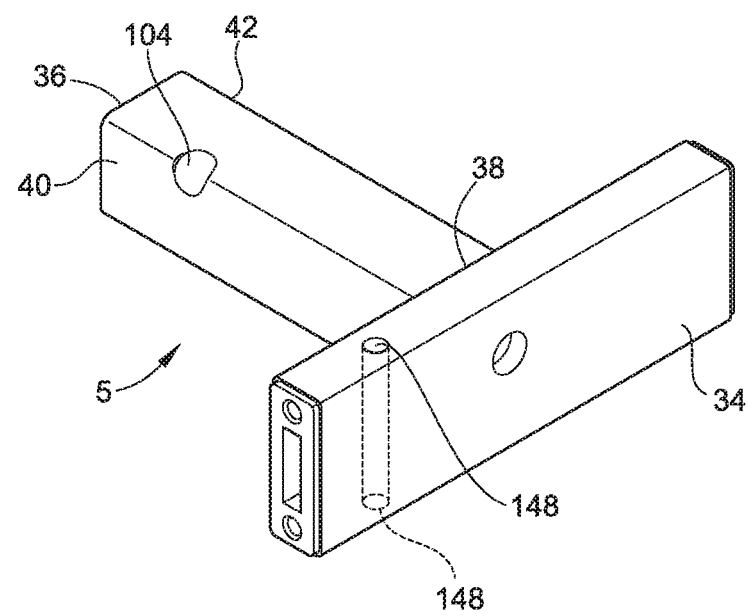
FIG. 17 is a front perspective view of the hitch bar of FIG. 16.

As illustrated in FIG. 16, in other embodiments, the receiver 12 may not have any through openings on the side walls 22, 24 of the receiver 12 or the through openings on the side walls 22, 24 of the receiver 12 may be damaged or inoperable.

As illustrated in FIGS. 3, 4, 14 and 15, the receiver 12 will include at least one chain loop or chain ring 146 which is commonly known in the art as being part of a trailer hitch receiver for connecting hitch safety chains (not pictured).

Hitch Bar 10:

The hitch bar 10 is the component that is inserted into the hitch receiver 12. As illustrated in the figures, the hitch bar 10 is an extended bar having a distal end 36, a proximal end 38, parallel side walls 40, 42, a top wall 44 and a bottom wall 46 in communication to form a square or rectangular shape for slidable placement within the opening 20 of the receiver 12. To match receiver opening 20 sizes, the dimensions of the hitch bar 10 are typically offered in 1.25" and 2.00." If the receiver opening 20 is a different size, it may be fitted with an additional "accessory" sleeve (not illustrated) to make up the difference between the size of the hitch bar 10 and the receiver opening 20. The hitch bar 10 is designed to be removably inserted within the receiver opening 20 of the hitch receiver 12.

As further illustrated in the figures, embodiments of the hitch bar 10 may include an accessory 33 and 34, such as a bike rack 33 or attachment plate 34. The hitch bar 10 is typically joined to the accessory 33 and 34 by welding or fastening such as by screws at the proximal end 38 of the hitch bar 10. If there is an accessory 33 and 34 combined with the hitch bar 10, the entire structure will still be referred to as the hitch bar 10. It should be understood that the bike rack 33 and the attachment plate 34 are merely examples of accessories that may be included as part of the hitch bar 10.

As illustrated in FIGS. 3-6 and 14-17, embodiments of the hitch bar 10 may have a cable receiving hole 148 bore through either the proximal end 38 of the hitch bar 10 or the accessory 33 and 34 portion of the hitch bar 10 for receiving the second end of a cable lock, which will be described in further detail below.

Slot 50 in Hitch Bar 10:

As illustrated in FIGS. 3-12, embodiments of the hitch bar 10 include an extended slotted depression or slot 50 generally formed on at least one of the side walls 40, 42 of the hitch bar 10, although the slot 50 can be placed on the top wall 44 or the bottom wall 46 if preferred. The slot 50 includes a defined proximal end 52 and distal end 54 and extends along the length of the hitch bar wall from the hitch bar proximal end 38 to the hitch bar distal end 36. As will be explained in the following paragraphs, the slot 50 may take on a number of variations. However, of importance is the fact that the slot 50 and the hitch pin opening 30 (in embodiments that include a slot 50 and hitch pin opening 30) must be in alignment for placement of the hitch pin 32. The slot 50 on the hitch bar 10 is what allows for the adjustability of the hitch bar 10 with respect to the hitch receiver 12, while still allowing for a locking hitch pin 32 to lock the hitch bar 10 to the hitch receiver 12. As can be seen in the figures, the slot 50 arrangement enables positioning of the hitch bar 10 such that the distal end 36 of the hitch bar can be positioned a greater or lesser distance from the distal end 14 of the receiver 12 as desired. As can be seen, the length of the slot 50 from the proximal end 52 to the distal end 54 is defined by the length of the hitch bar 10. Without wishing to be restricted to any set distances, a typical range of slot positioning can extend from 1 to 10 inches or more. The slot 50 allows the hitch bar 10 to lock in a wide range of positions with respect to the receiver 12.

Due to the action of the hitch pin 32 passing through the hitch pin opening 30 on the hitch receiver and the slot 50 on the hitch bar 10, the hitch bar 10 is unable to be removed from the receiver 12 when the hitch pin 32 is properly placed thereon. As illustrated in FIGS. 3-12, the depression can take on various forms and embodiments.

As illustrated in FIGS. 14-17, in other embodiments, the hitch bar 10 does not include any slot 50. The hitch bar 10 is slidably adjustable in the receiver 12 between the distal end 36 and proximal end 38 of the hitch bar 10. It is the anti-wobble mechanism 100, as explained in greater detail below, in combination with the cable lock unit 130, as explained in greater detail below, that allows for the securing and positive locking of the hitch bar 10 to the receiver 12. Without wishing to be restricted to any set distances, a typical range of hitch bar 10 adjustability can be 1-7 inches. The anti-wobble mechanism 100 combined with the cable lock unit 130 allows the hitch bar 10 to lock in a wide range of positions with respect to the receiver 12.

First Embodiment—Through Slot

Reference is made to FIGS. 3-7 for a hitch receiver unit 5 wherein the slot 50 takes the form of a pass-through slot system having a first extended slot 50a in sidewall 22 and a second extended slot 50b in sidewall 40, wherein the first extended slot 50a is aligned with the second extended slot 50b in sidewall 42 to enable the hitch pin 32 to pass through the hitch bar 10 as illustrated in FIGS. 3 and 5. The hitch receiver 12 also includes a pair of aligned receiver openings 30a, 30b. Receiver opening 30a is positioned on sidewall 22 and hitch pin opening 30b is positioned on sidewall 24. In this manner, the hitch bar 10 can be slidably positioned within the receiver 12 such that the proximal end 38 of the hitch bar 10 can be spaced away from the distal end 14 of the receiver 12 at various increments along the slot system 50. As stated above, the hitch pin 32 effectively slidably locks the hitch bar 10 to the receiver 12.

Second Embodiment—Single Slot

Figure 8:
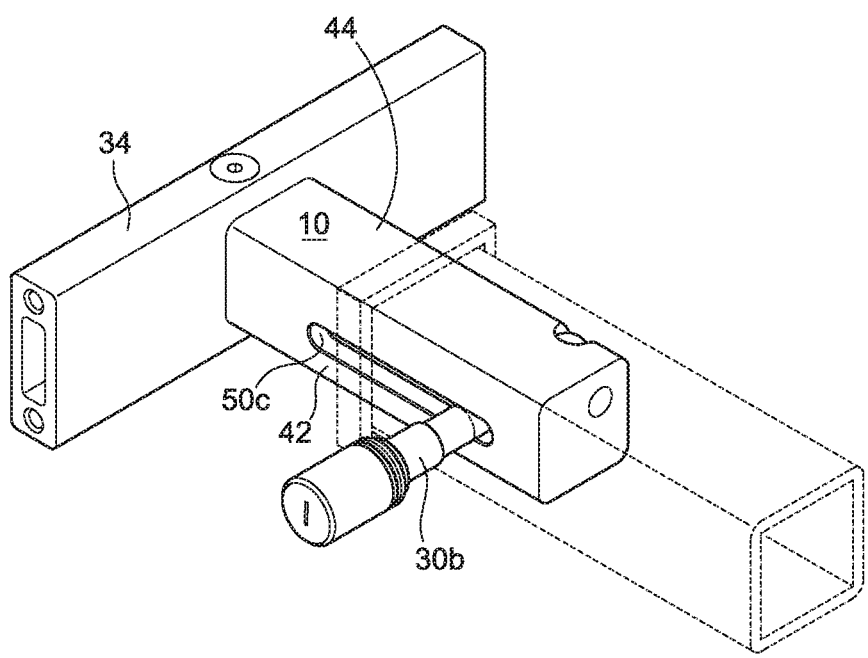
FIG. 8 is a rear perspective view of a second embodiment "single slot" locking adjustable trailer hitch assembly of FIG. 7.

Reference is made to FIG. 8 for a second embodiment of the slot system which comprises a single slot 50c positioned alongside one sidewall of the hitch bar 10. As illustrated, the slot 50c is located on sidewall 42 of the hitch bar 10. However, it is equally contemplated that the slot 50c could be placed on sidewall 40 or top wall 44 or bottom wall 46. Likewise, there is only one hitch pin opening 30b required in the receiver 12 for placement of the hitch pin 32.

Third Embodiment—Single Trough

Figure 9:
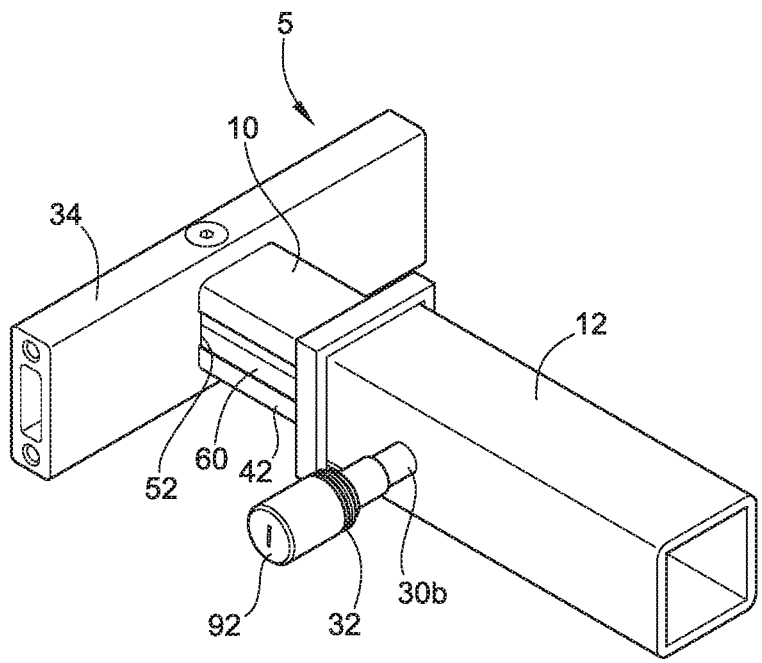
FIG. 9 is a rear perspective view of a third embodiment "single trough" locking adjustable trailer hitch assembly of the present invention.
Figure 10:
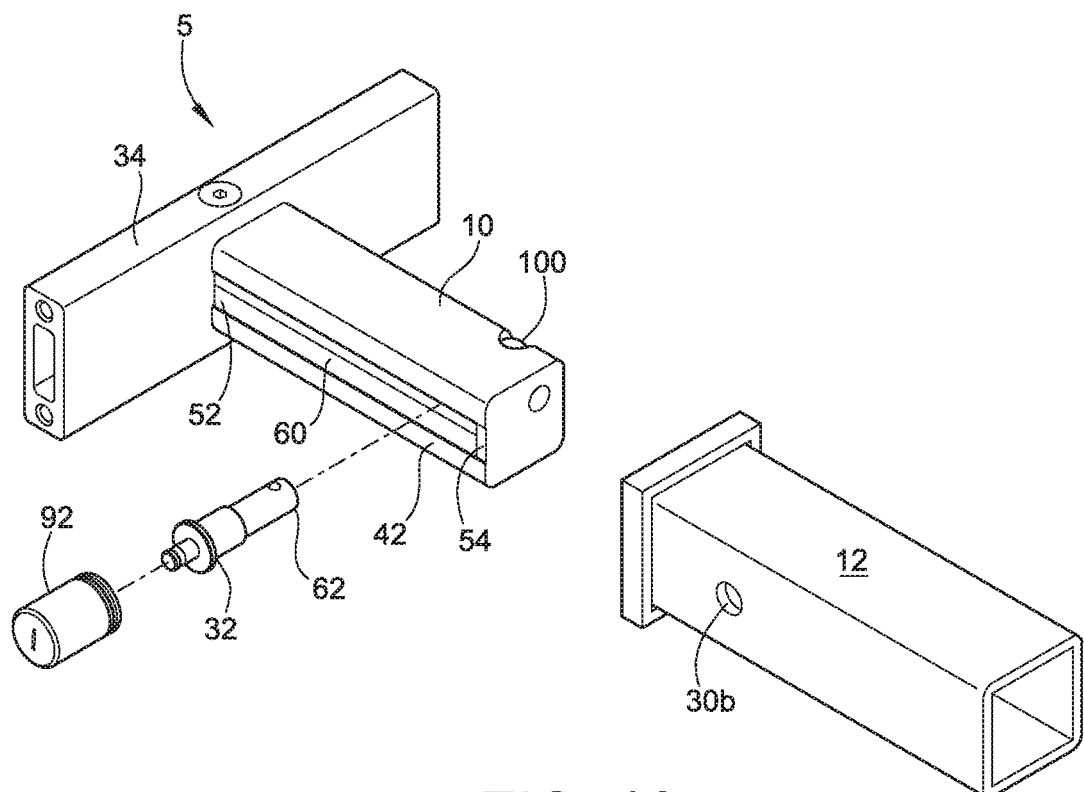
FIG. 10 is an exploded rear perspective view of the locking adjustable trailer hitch assembly of FIG. 9.

Reference is made to FIGS. 9 and 10 for a third embodiment of the slot system which comprises a single extended non-pass-through extended depression or trough 60 alongside one sidewall of the hitch bar 10. Like the single slot system discussed above, the trough 60 is illustrated as being placed on sidewall 42 of the hitch bar 10. However, it is equally contemplated that the trough 60 could be placed on sidewall 40 or top wall 44 or bottom wall 46. There is also only one hitch pin opening 30b required in the receiver 12 for placement of the hitch pin 32. Unlike the slot system 50 discussed above, the trough 60 does not penetrate through the sidewall 42. Rather, it is a scooped depression alongside the sidewall 42 as illustrated from the proximal end 52 to the distal end 54 of the trough 60. When assembled, as illustrated in FIG. 9, the hitch pin 32 is inserted through the receiver opening 30b and locked in place such that the end 62 penetrates beyond the surface of the side wall 42 and locks into the trough 60. In this manner, the hitch bar 10 is effectively slidably locked onto the receiver 12.

Fourth Embodiment—Double Trough

Figure 11:
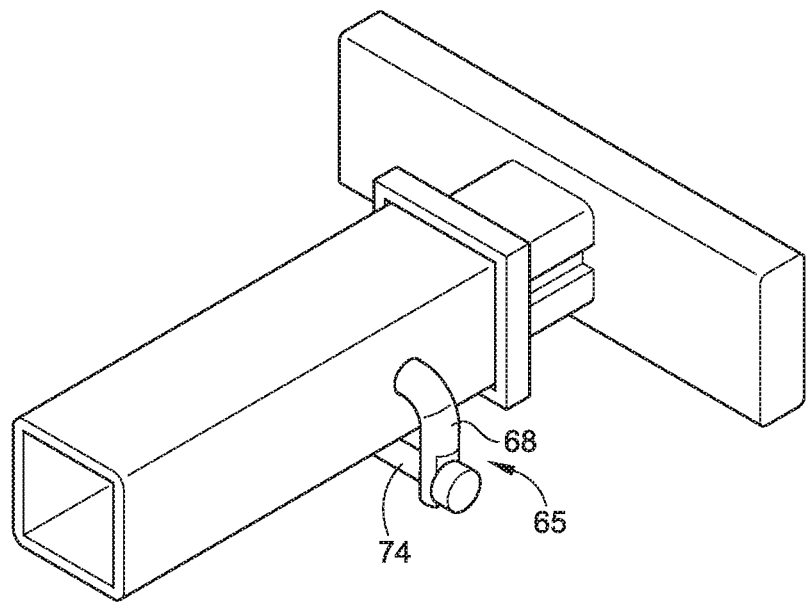
FIG. 11 is a rear perspective view of a fourth embodiment "double trough" locking adjustable trailer hitch assembly of the present invention.
Figure 12:
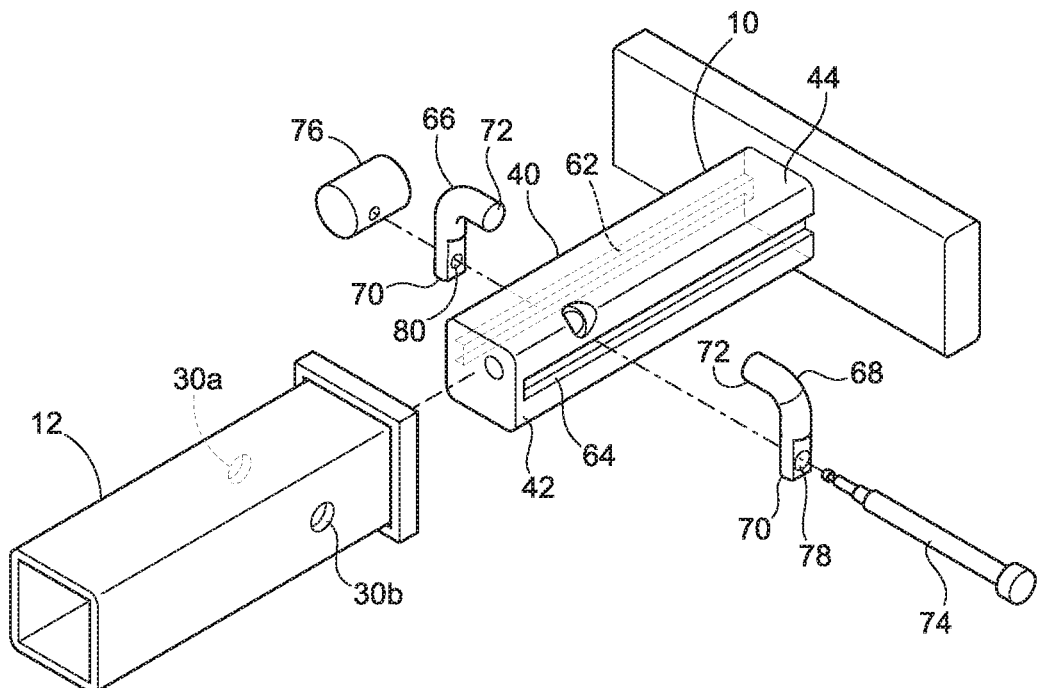
FIG. 12 is an exploded rear perspective view of the locking adjustable trailer hitch assembly of FIG. 11.

Reference is made to FIGS. 11 and 12 for a fourth embodiment of the slot system which comprises a double trough system wherein opposing non-pass-through depressions or troughs 62, 64 are placed on sidewalls 42, 44 respectively. The shape and dimensions of the troughs 62, 64 are similar to that described with respect to trough 60 above. However, this embodiment requires opposing hitch pin openings 30a, 30b in each of the sidewalls 42, 44. In this manner, the hitch bar 10 is slidably secured to the receiver 12 by a locking pin arrangement 65, known to the art, comprising opposing L-shaped locking pins 66, 68 having a proximal end 70 and a distal end 72. When assembled, as illustrated in FIG. 11, the distal ends 72 of the L-shaped locking pins 66, 68 are inserted through the receiver openings 30a, 30b such that the distal ends 72 penetrate beyond the surface of the side walls 42, 44 and lock into the troughs 62, 64 respectively. The L-shaped locking pins 66, 68 are then secured by a pin 74 and lock 76 mechanism, known to the art, wherein the pin 74 is inserted through openings 78, 80 at the proximal end 70 of the L-shaped locking pins 66, 68 and secured therein by the lock 76. As is known in the art, the lock 76 can be a standard releasable attachment device or it can include and combination or a key lock. In this manner, the hitch bar 10 is effectively slidably locked onto the receiver 12.

Figure 10A:
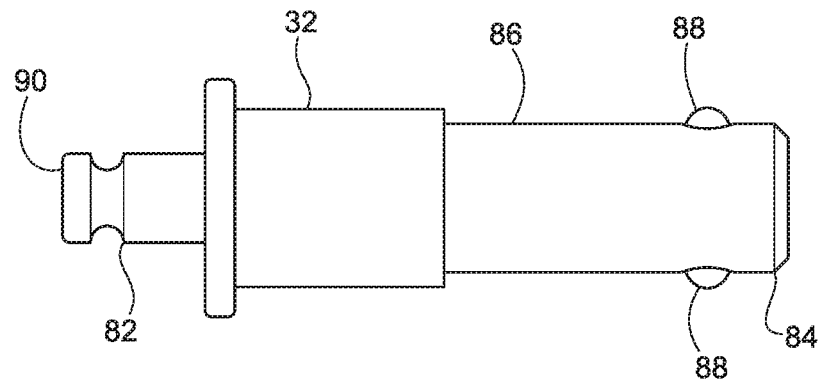
FIG. 10A is a side elevated view of the trailer hitch pin of FIG. 10.

Locking Pin 32:

The purpose of the locking pin 32 is to secure the hitch bar 10 to the receiver 12 to prevent the hitch bar 10 from separating from the receiver 12. The locking pin 32 is a standard receiver pin known to art for this purpose and can take many forms. As illustrated in FIGS. 10 and 10a, a typical locking pin 32 includes a proximal end 82 and a distal end 84. The distal end 84 passes through the receiver opening 30. Depending upon which slot embodiment is used, the distal end 84 may (1) pass through hitch pin openings 30 and slots 50a, 50b (first or through slot embodiment); (2) pass through one hitch pin opening 30 and slot 50c (second or single slot embodiment); (3) pass through one hitch pin opening 30 where the distal end of the locking pin 32 enters the trough 60 (third or single trough embodiment; or (4) pass through opposing hitch pin openings 30a, 30b, by means of L-shaped locking pins 66, 68 (fourth or double trough embodiment). The action of the locking pin 32 locks the distal end 84 of the locking pin 32 in place with one or more hitch pin openings 30 such that the locking pin 32 cannot be retracted and the hitch pin 10 is slidably secured to the receiver 12 along the path of the slot 50. When the locking pin 32 is in place, the hitch bar 10 may be slidably moved along the length of the slot 50 until reaching either the proximal end 52 or distal end 54 of the slot 50. In this manner, the hitch bar 10 may travel along the length of the slot 50 in order to either extend the hitch bar 10 from the receiver 12 or retract the hitch bar 10 within the receiver 12. However, the range of movement of the hitch bar 10 is limited to the length of the slot 50. Further, the hitch bar 10 cannot be separated from the receiver 12.

As illustrated in FIG. 10A, one method of actuating the locking pin 32 involves the action of a spring pin (not shown) within the chamber 86. The spring pin actuates a set of expansion balls 88 near the distal end 84 that are actuated up and down with a push button 90 on the proximal end 82 of the locking pin 32. Once the locking pin 32 is inserted into the receiver hitch pin opening 30, the locking pin 32 cannot be retracted unless the push button 90 is compressed. In order to stop the push button 90 from being compressed, which locks the locking pin 32 within the receiver, a lock 92 can be added over the push button 90. Reference is made to FIGS. 9 and 10 for a representation of the lock 92. As illustrated, the lock 92 may be a key lock. However, other locks are contemplated.

In general, the hitch pin 32 is not intended to restrict the movement of the hitch bar 10 within the receiver 12. The hitch pin 32 does, however, create an interference so that the hitch bar 10 cannot be removed from the receiver 12.

Anti-Wobble Mechanism:

Reference is made to FIGS. 6, 7, 13 and 17 for the anti-wobble device 100 of the present invention. Anti-wobble devices are known to the industry as devices used to stabilize the hitch bar 10 within the hitch receiver 12 and secure the hitch bar 10 and tighten it in place within the receiver 12.

Figure 13:
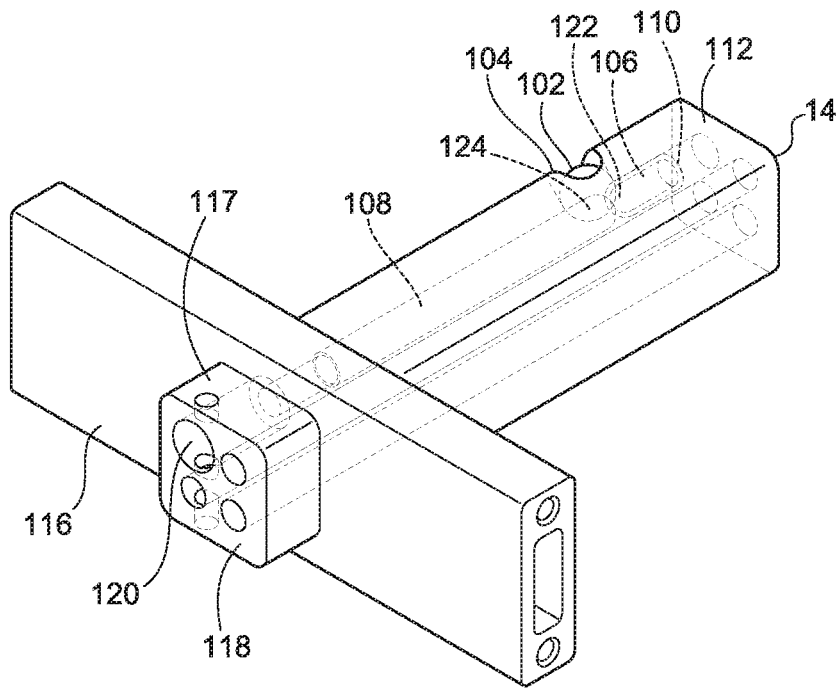
FIG. 13 is a front perspective view of the trailer hitch assembly of the present invention illustrating an anti-wobble mechanism.
Figure 14:
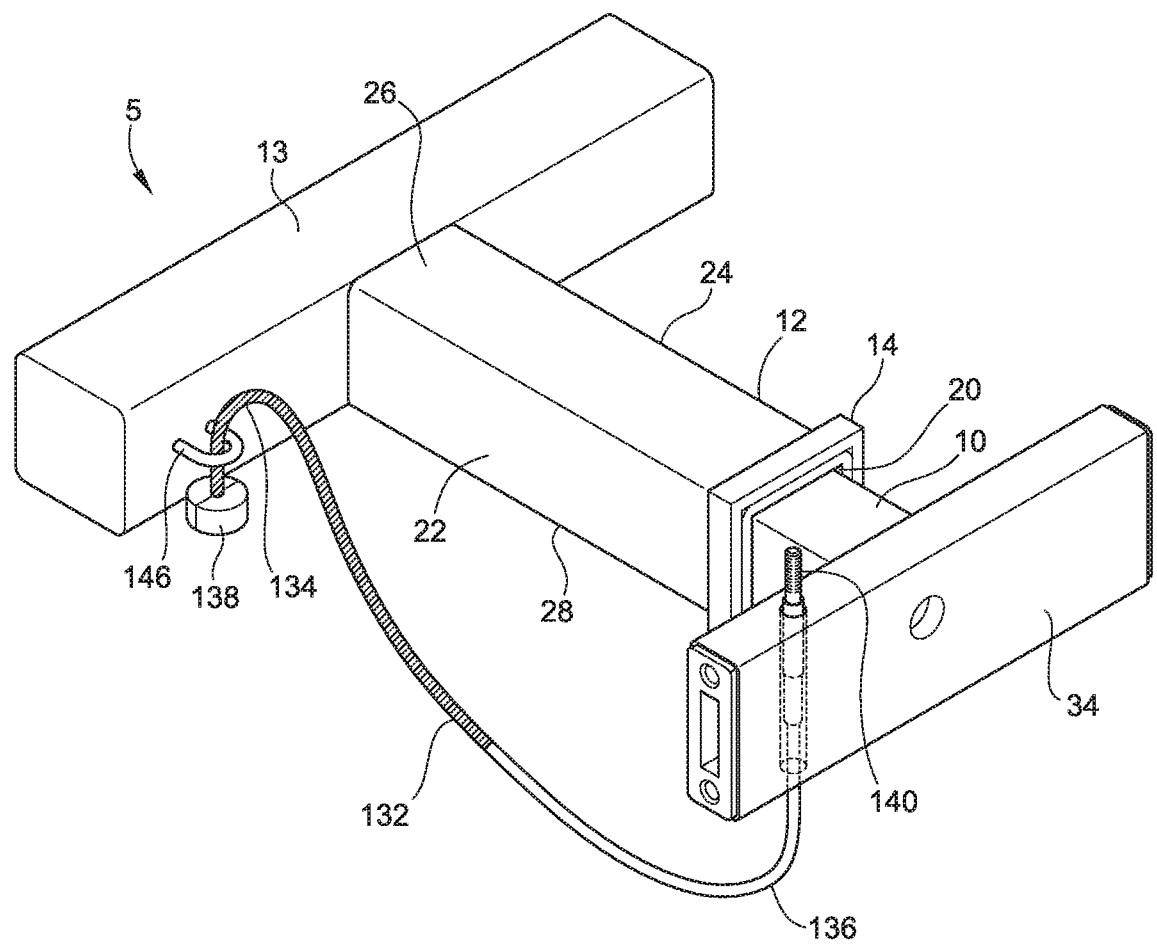
FIG. 14 is a front perspective view of an embodiment of the locking adjustable hitch assembly of the present invention with no slot, showing the cable lock attached to the hitch receiver and the hitch bar.
Figure 15:
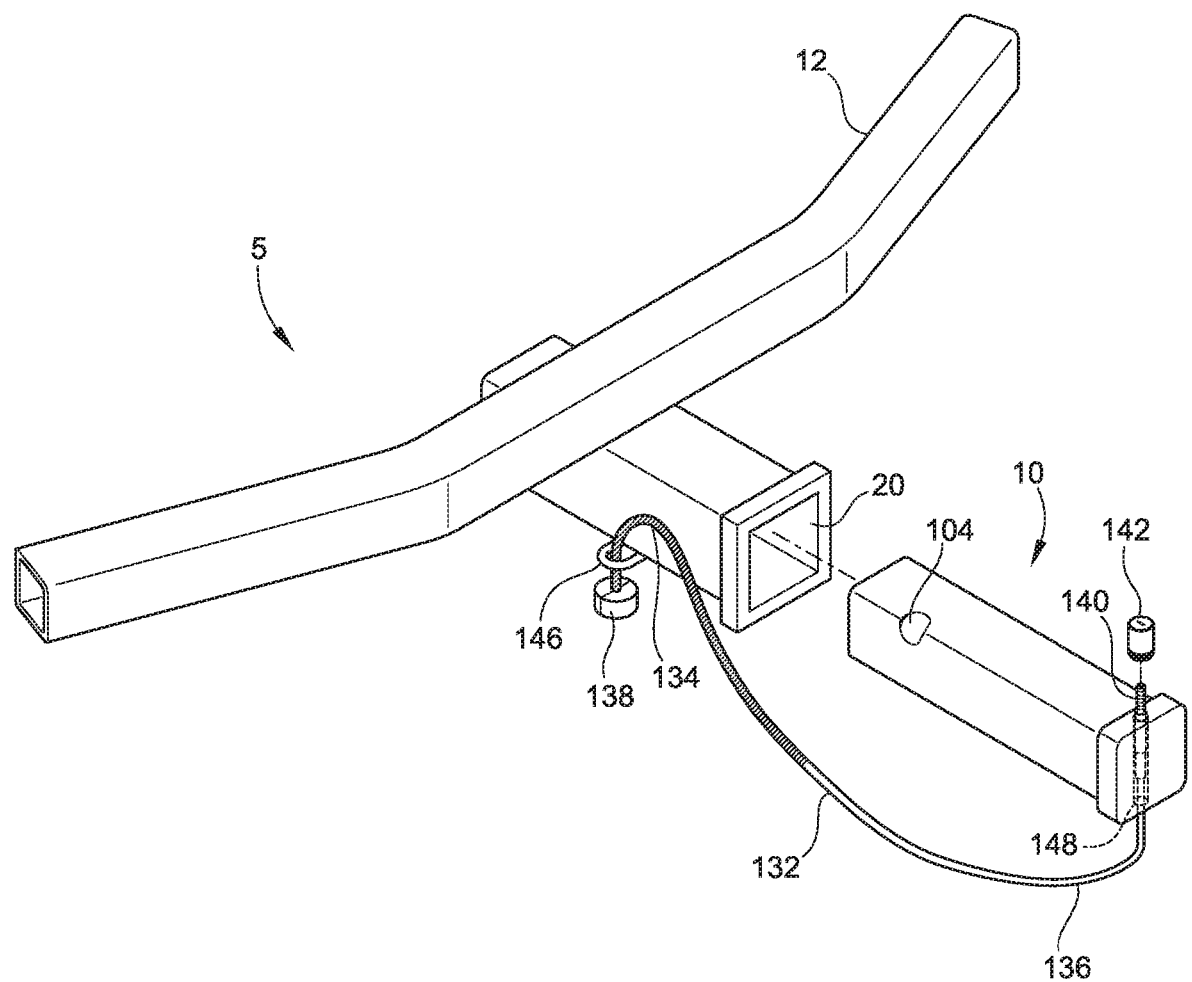
FIG. 15 is a front perspective view of an embodiment of the locking adjustable hitch assembly of the present invention with no slot, showing the cable lock attached to the hitch receiver and the hitch bar with the releasable lock.

A representative anti-wobble device 100 is illustrated in FIG. 13. Referring to this figure, the anti-wobble device 100 includes a spherical or ball-shaped bearing 102 which is actuated at an intersecting edge of the side walls 22, 24 and the top 26 or bottom wall 28 of the receiver. As illustrated, the opening 104 is positioned on an intersecting edge between the side wall 42 and the top wall 44 near the distal end 14 of the receiver 12 to emerge from a bearing opening 104. As illustrated in FIG. 13, the bearing 102 rests at the intersection of two horizontally positioned posts 106, 108 within the interior of the hitch bar 10. Post 106 is positioned such that its posterior end 110 is immobile and aligned with the back wall 112 of the hitch bar 10 at the distal end of the hitch bar 10. Elongated post 108 is positioned within the interior of the hitch bar 10 in alignment with post 106. The posterior end 110 of the post 106 is threadably positioned within a chamber 116 on the hitch bar 10 at the threaded location 117. Returning to the bearing 102, it is shown to rest on the conically shaped distal ends 122, 124 of the posts 106, 108. The head 118 of the post 108 preferably contains a slot 120 for receiving the end of a slotted screwdriver (not shown). By rotating the screwdriver within the slot 120, the post 108 can be urged such that the distance between the distal ends 122, 124 of posts 106, 108 can be decreased thereby elevating the bearing 102 through the bearing opening 104 or extended thereby drawing the bearing 104 within the interior of the hitch pin 10. By elevating the bearing 102 through the bearing opening 104, the bearing 102 will be urged against the interior surface of the retainer 12 thereby securing and stabilizing the hitch bar 10 into the receiver 12.

In this manner, the hitch bar 10 can be positioned at any length along the slot 50 to a preferred position (in embodiments which require a slot 50 on the hitch bar 10). The locking pin 32 ensures that the hitch bar 10 will be slidably secured with the receiver 12. The anti-wobble device 100 is then used to stabilize and secure the hitch bar 10 within the receiver 12 at the desired location along the slot 50. The friction caused by the anti-wobble device 100 against the interior wall of the receiver 12 will prevent the hitch bar 10 from sliding along the length of the slot 50. The cable lock unit 130, as described in greater detail below, provides extra assurance that the hitch bar 10 is secured to the hitch receiver 12. Further the cable lock unit 130 may provide for a greater range of positioning the hitch bar 10 in the hitch receiver 12 than what the slot 50 provides for. This greater adjustability may be required in some situations.

In embodiments that do not require a slot on the hitch bar 10, the hitch bar 10 can be positioned at any length between the distal end 36 and proximal end 38 of the hitch bar 10. The cable lock unit 130, as described in greater detail below, ensures that the hitch bar 10 will be slidably secured with the receiver 12. The anti-wobble device 100 is then used to stabilize and secure the hitch bar 10 within the receiver 12 at the desired location along the length of the hitch bar 10. The friction caused by the anti-wobble device 100 against the interior wall of the receiver 12 will prevent the hitch bar 10 from sliding along the length of the hitch bar 10.

While the above description illustrates a preferred anti-wobble device, there are other anti-wobble mechanisms which can be used, such as driving a round bearing or wedge into the corner of the receiver 12. This drives the hitch bar 10 down and to the side, tightening the hitch bar 10 into the receiver 12.

In addition, there are accessory options for use to tighten the hitch bar 10 into the receiver 12, such as a U-bolt and plate tightened on both the receiver 12 and the hitch bar 10 creating a stable connection. Other anti-wobble mechanism devices are known to exist for similar purposes and the present invention is not restricted to the device described herein.

Cable Lock 130:

Reference is made to FIGS. 3, 4, 14, 15, and 18-30 for the cable lock 130 of the present invention. Cable lock devices are known to the industry as devices used to lock bikes and other equipment to other objects. For example, a cable lock might be used to lock a bike to a bike stand affixed to the pavement. However, cable lock devices are not known in the industry for locking a hitch bar to a hitch receiver. Nor are they known in the industry for securing an adjustable hitch bar to a hitch receiver in combination with an anti-wobble device. In embodiments of the hitch bar 10 that do not include a slot, the cable lock 130 is what allows for the adjustability of the hitch bar 10 with respect to the hitch receiver 12, while still allowing for a positive lock to lock the hitch bar 10 to the hitch receiver 12. In embodiments of the hitch bar 10 that do include a slot 50, the cable lock 130 allows for a backup positive lock to the locking hitch pin 32. In other embodiments of the hitch bar 10 that do include a slot 50, the cable lock 130 also allows for a primary positive lock in systems where the slot 50 does not line up with the hitch pin opening 30 or for systems where the hitch pin opening 30 has been damaged. It should be understood that the cable lock 130 is designed to keep the hitch bar 10 attached to the hitch receiver 12 even if the anti-wobble device 100 fails to secure the hitch bar 10 to the hitch receiver 12 and prevent the hitch bar 10 from falling out of the hitch receiver 12.

As illustrated in FIGS. 3, 4, 14, 15, 18-29, an embodiment of the cable lock 130 includes a cable 132 with a first end 134 and a second end 136. The first end 134 of the cable 132 is designed to releasably attach to the chain loop 146 and the second end 136 of the cable 132 is designed to releasably attach to the hitch bar 10. As will be explained below, the first end 134 and the second end 136 of the cable 132 may take on a number of variations. However, of importance is the fact that the cable lock 130 connects and releasably locks the hitch bar 10 to the hitch receiver 12. The cable lock 130 will be a sufficient length to allow the hitch bar 10 to be positioned along the length of the hitch bar 10 in the hitch receiver 12. Without wishing to be restricted to any set distances, a typical range of lengths for the cable lock 130 can be 12 to 18 inches or more.

First Embodiment—First End—Cable Stop

As illustrated in FIGS. 3, 4, 14, 15 and 20, in one embodiment the first end 134 of the cable 132 includes a cable stop 138 positioned on the cable 132 along the first end 134 of the cable 132. The cable stop 138 is at least larger in diameter than the chain loop 146, preventing the first end 134 of the cable 132 from pulling through the chain loop 146 when the second end 136 of the cable 132 is passed through the chain loop 146. The cable stop 138 is positioned on the first end 134 of the cable 132 such that the cable stop 138 cannot be removed via the first end 134 of the cable 132. Therefore, when the second end 136 of the cable 132 passes through the chain loop 146 a person could not remove the cable stop 138 from the first end 134 of the cable 132 thereby securing the first end 134 of the cable 132 to the cable loop 146.

Second Embodiment—First End—Adjustable Cable Stop

As illustrated in FIGS. 21-26, in one embodiment the cable lock 130 is adjustable along the first end 134 of the cable 132, such that if the cable has additional slack when attached to the system, the slack can be taken in through the cable stop 138 to shorten the length of the cable 132 between the cable stop 138 and the second end 136 of the cable 132. The first end 134 of the cable 132 includes a cable stop 138 positioned on the cable 132 along the first end 134 of the cable 132. The cable stop 138 is at least larger in diameter than the chain loop 146, preventing the first end 134 of the cable 132 from pulling through the chain loop 146 when the second end 136 of the cable 132 is passed through the chain loop 146. The cable lock 130 also includes a cable grip 139 and an end cable stop 144. The end cable stop 144 is attached to the first end 134 of the cable 132 and is at least greater in diameter than a gripping channel (not shown) of the cable grip 139. In one embodiment, the cable grip 139 is moveably positioned on the cable 132 adjacent a distal end of the cable stop 138 such that the cable 132 extends through the cable stop 138 and through the cable grip 139.

Figure 21:
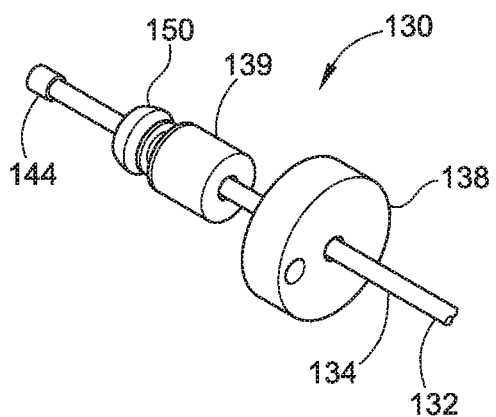
Figure 22:
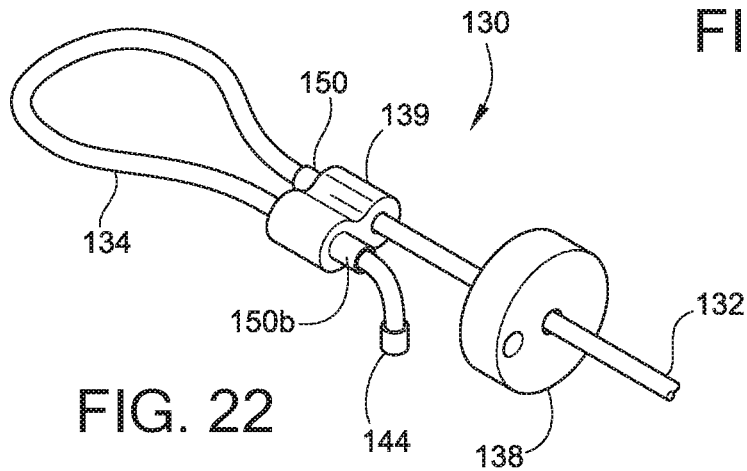
Figure 24:
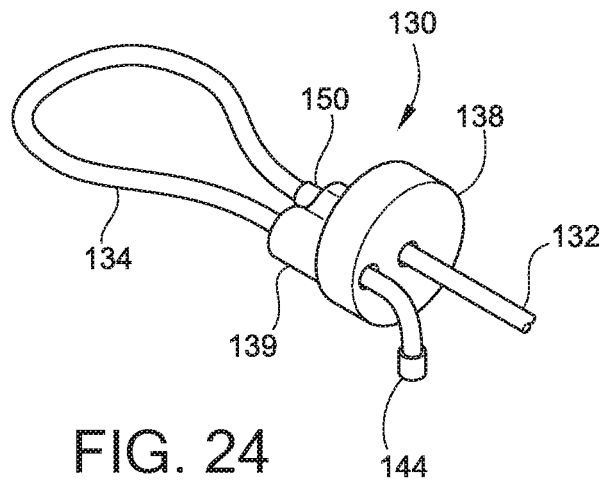
Figure 25:
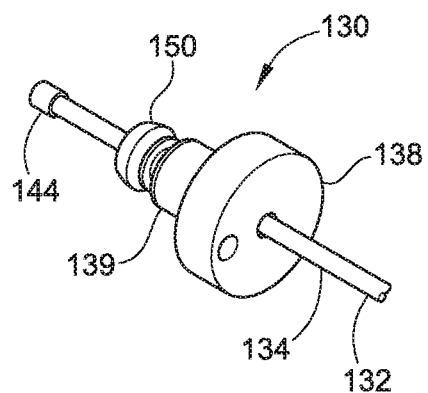

The cable grip 139 includes a gripping channel through which the cable passes. As illustrated in FIG. 21, in one embodiment, the cable grip 139 has a single gripping channel (not labeled) that the cable 132 passes through, a mechanism (not pictured) for gripping and locking the cable in place in a single direction of motion, and a release 150 for unlocking the cable 132 in the cable grip 139 to allow the cable 132 to move in two directions of motion. As illustrated in FIG. 22, in one embodiment, the cable grip 139 has two gripping channels (not labeled) where the cable 132 passed through the first gripping channel in one direction, exits the first gripping channel in the same direction, loops, and passes through the second gripping channel in the opposite direction. As illustrated in FIGS. 21 and 22, in one embodiment, the cable grip 139 may be a separate component from the cable stop 138. The cable grip 139 may be placed on the cable 132 between the end cable stop 144 and the cable stop 138. The cable grip 139 will have a diameter larger than a channel (not pictured) in the cable stop 138 through which the cable 132 passes. When attached to the system 5, the cable grip 139 is adjacent to the cable stop 138 and secures the length of cable 132 between the cable stop 138 and the second end 136 of the cable 132 to a set position. As illustrated in FIGS. 24 and 25, in one embodiment, the cable stop 138 may include a cable grip 139 attached to the cable stop 138 such that they are one component. In embodiments where the cable stop 138 includes the cable grip 139, it should be understood that the cable grip 139 could be attached to either side of the cable stop 138 along the cable 132 and could be either a single channel cable grip or a double channel cable grip.

To increase the length of cable 132 between the cable stop 138 and the second end 136 of the cable 132, the cable grip 139 has a release 150 and 150b for each gripping channel. Each release 150 and 150b either may be keyed or not keyed. When the release 150 or 150b is activated, the cable 132 will be able to freely move in two directions of motion. When the release is deactivated, the cable 132 will only be adjustable in one direction of motion, such that the length of cable 132 between the cable stop 138 and the second end 136 of the cable 132 is decreased. The adjustability allows the use of a single cable lock for a variety of hitch bar 10 positions in the hitch receiver 12.

Third Embodiment—First End—Adjustable Cable Stop with Lock

Figure 19:
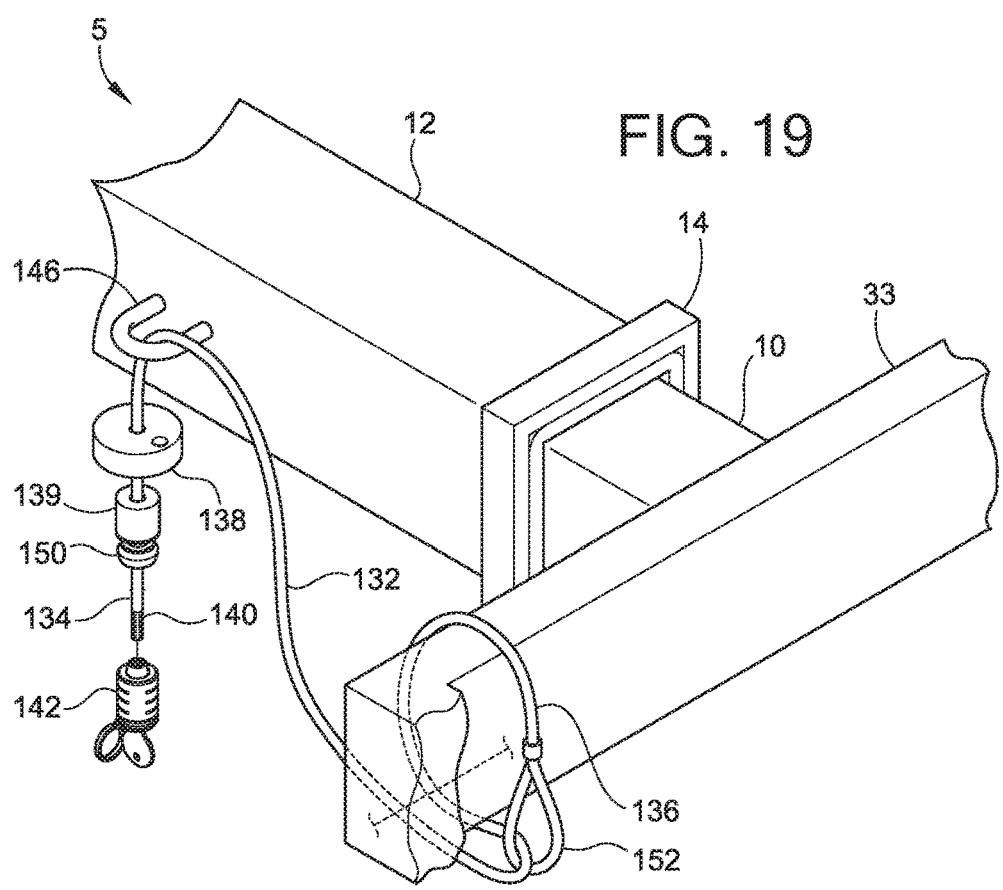
FIG. 19 is a partial front perspective view of the preferred embodiment of the cable lock for the system.
Figure 20:
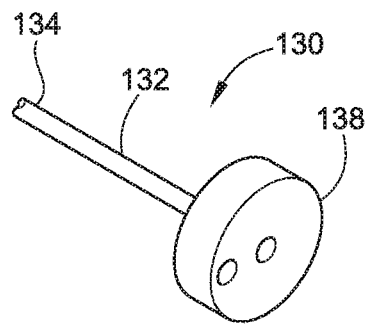
FIGS. 20-26 are partial perspective views of embodiments of the first end of the cable lock.
Figure 23:
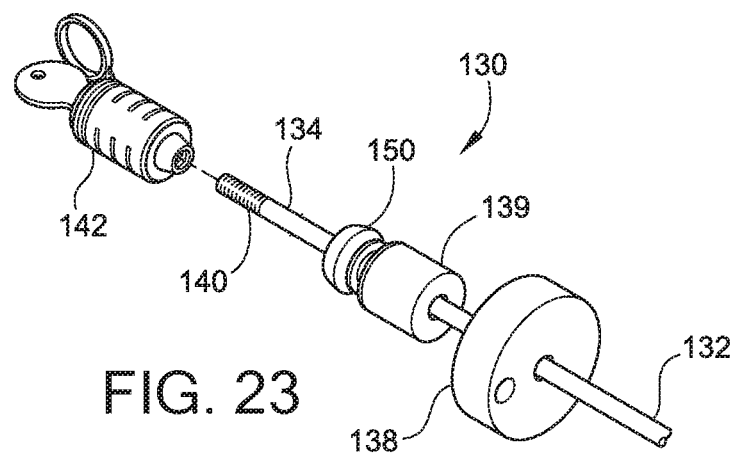
Figure 26:
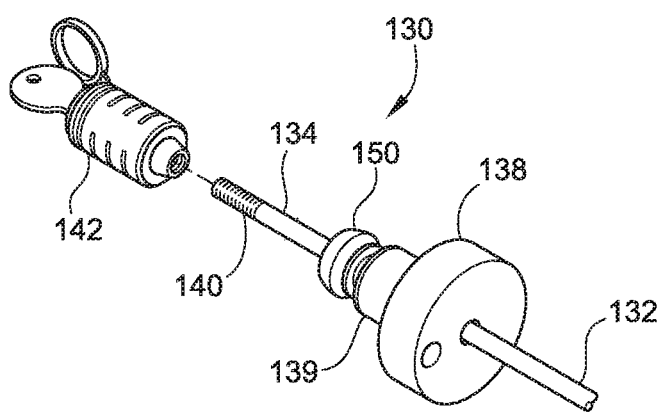

As illustrated in FIGS. 19, 23 and 26, in one embodiment the cable lock 130 includes a lock 142 at the first end 134 of the cable 132 and is also adjustable along the first end 134 of the cable 132, such that if the cable has additional slack when attached to the system, the slack can be taken in through the cable stop 138 to shorten the length of the cable 132 between the cable stop 138 and the second end 136 of the cable 132. The first end 134 of the cable 132 includes a cable stop 138 positioned on the cable 132 along the first end 134 of the cable 132. The cable stop 138 is at least larger in diameter than the chain loop 146, preventing the first end 134 of the cable 132 from pulling through the chain loop 146 when the second end 136 of the cable 132 is passed through the chain loop 146. The cable lock 130 also includes a cable grip 139, a lock receiving end 140, and a lock 142. The lock receiving end 140 is attached to the first end 134 of the cable 132 and is smaller in diameter than a gripping channel (not shown) of the cable grip 139.

Figure 27:
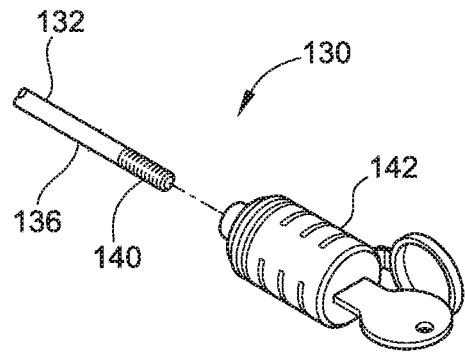
FIGS. 27-29 are partial perspective views of embodiments of the second end of the cable lock with a lock.
Figure 28:
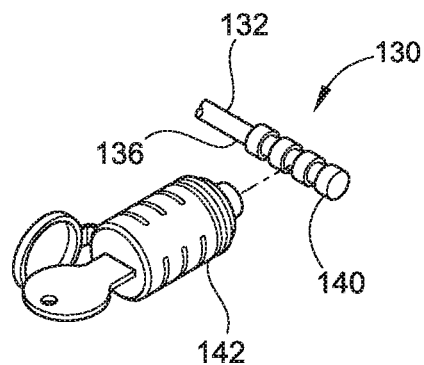
Figure 29:
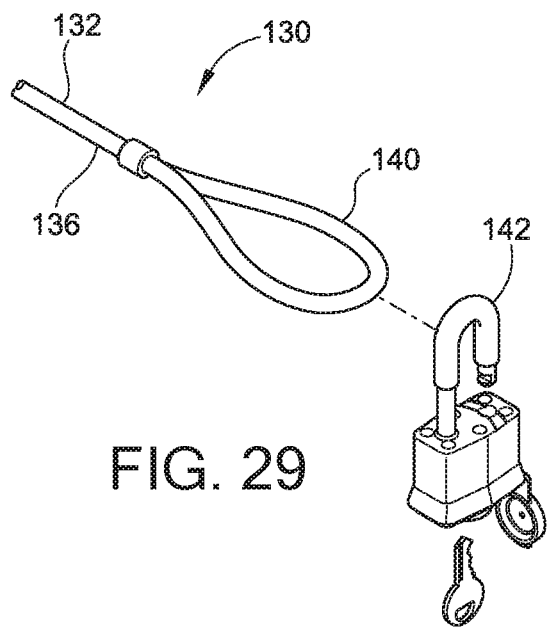

As illustrated in FIGS. 27-29, the lock receiving end 140 and lock 142 encompass a number of different embodiments and are not limited by the embodiments shown in the figures. The important feature of these embodiments of the lock receiving end 140 and the lock 142 is that they can be paired such that the lock receiving end 140 is configured to receive the lock 142 such that the lock 142 releasably attaches to the lock receiving end 140. In one embodiment, as illustrated in FIG. 27, the lock receiving end 140 is an end cable locking bolt and the lock 142 releasably attaches to the end cable locking bolt. In another embodiment, as illustrated in FIG. 28, the lock receiving end 140 is a pin lock end and the lock 142 is adapted to attach to the pin lock end. In another embodiment, as illustrated in FIG. 29, the lock receiving end 140 is a fixed loop at the end of the cable and the lock 142 is a padlock. It should be understood that above embodiments are merely examples of lock receiving ends 140 and paired locks 140 and the examples should not be construed as limiting.

In one embodiment, the cable grip 139 is moveably positioned on the cable 132 adjacent a distal end of the cable stop 138 such that the cable 132 extends through the cable stop 138 and through the cable grip 139. The cable grip 139 includes a gripping channel (not labeled) through which the cable 132 passes. As illustrated in FIG. 23, in one embodiment, the cable grip 139 has a single gripping channel (not labeled) that the cable 132 passes through, a mechanism (not pictured) for gripping and locking the cable in place in a single direction of motion, and a release 150 for unlocking the cable 132 in the cable grip 139 to allow the cable 132 to move in two directions of motion. As illustrated in FIG. 22, in one embodiment, the cable grip 139 has two gripping channels (not labeled) where the cable 132 passed through the first gripping channel in one direction, exits the first gripping channel in the same direction, loops, and passes through the second gripping channel in the opposite direction. As illustrated in FIGS. 22 and 23, in one embodiment, the cable grip 139 may be a separate component from the cable stop 138. The cable grip 139 may be placed on the cable 132 between the end cable stop 144 and the cable stop 138. The cable grip 139 will have a diameter larger than a channel (not pictured) in the cable stop 138 through which the cable 132 passes. When attached to the system 5, the cable grip 139 is adjacent to the cable stop 138 and secures the length of cable 132 between the cable stop 138 and the second end 136 of the cable 132 to a set position. As illustrated in FIGS. 25 and 26, in one embodiment, the cable stop 138 may include a cable grip 139 attached to the cable stop 138 such that they are one component. In embodiments where the cable stop 138 includes the cable grip 139, it should be understood that the cable grip 139 could be attached to either side of the cable stop 138 along the cable 132 and could be either a single channel cable grip or a double channel cable grip.

To increase the length of cable 132 between the cable stop 138 and the second end 136 of the cable 132, the cable grip 139 has a release 150 and 150b for each gripping channel. Each release 150 and 150b either may be keyed or not keyed. When the release 150 or 150b is activated, the cable 132 will be able to freely move in two directions of motion. When the release is deactivated, the cable 132 will only be adjustable in one direction of motion, such that the length of cable 132 between the cable stop 138 and the second end 136 of the cable 132 is decreased. The adjustability allows the use of a single cable lock for a variety of hitch bar 10 positions in the hitch receiver 12.

Fourth Embodiment—Second End—Locking End

As illustrated in FIGS. 3, 4, 14, 15, 19, and 27-29, in one embodiment, the cable lock 130 includes a lock receiving end 140, and a lock 142. In this embodiment the hitch bar 10 will include a cable receiving hole 148 bore through either the proximal end 38 of the hitch bar 10 or the accessory 33 and 34 of the hitch bar 10, as described above. The lock receiving end 140 is attached to the second end 136 of the cable 132 and is smaller in diameter than the cable receiving hole 148.

As illustrated in FIGS. 3, 4, 14, 15, 19, and 27-29, the lock receiving end 140 and lock 142 encompass a number of different embodiments and are not limited by the embodiments shown in the figures. The important feature of these embodiments of the lock receiving end 140 and the lock 142 is that they can be paired such that the lock receiving end 140 is configured to receive the lock 142 such that the lock 142 releasably attaches to the lock receiving end 140. In one embodiment, as illustrated in FIG. 27, the lock receiving end 140 is an end cable locking bolt and the lock 142 releasably attaches to the end cable locking bolt. In another embodiment, as illustrated in FIG. 28, the lock receiving end 140 is a pin lock end and the lock 142 is adapted to attach to the pin lock end. In another embodiment, as illustrated in FIG. 29, the lock receiving end 140 is a fixed loop at the end of the cable and the lock 142 is a padlock. It should be understood that above embodiments are merely examples of lock receiving ends 140 and paired locks 140 and the examples should not be construed as limiting. In an embodiment, the lock receiving end 140 is of similar structure to hitch pin 32 with the non-locking end of the hitch pin 32 attached to the second end 136 of the cable 132. The lock 142 can be of any number of forms known in the industry provided the lock 142 has a diameter larger than the cable receiving hole 148 such that the lock 142 cannot pass through the cable receiving hole 148 and provided the lock 142 is capable of being releasably coupled to the lock receiving end 140. As illustrated in the figures, the lock 142 may be a key lock. However, other locks are contemplated.

The second end 136 of the cable 132 may be first received through the chain loop 146 and then received through the cable receiving hole 148. The lock 142 can then be releasably coupled to the lock receiving end 140, such that the cable lock secures the hitch bar 10 to the hitch receiver 12 in a locked fashion.

Fifth Embodiment—Second End—Looping End

Figure 30:
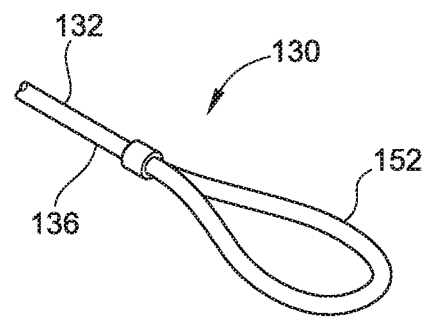
FIG. 30 is a partial perspective view of an embodiment of the second end of the cable lock with a fixed loop and no lock.

As illustrated in FIGS. 19 and 30, in one embodiment the cable lock 130 includes a fixed loop 152 at the second end 136 of the cable 132. The fixed loop 152 is formed by the second end 136 of the cable 132. The fixed loop 152 has a diameter great enough to allow the first end 134 of the cable 132 to pass through the fixed loop 152. In this embodiment, the hitch bar 10 includes an accessory 33 and 34. The second end 136 of the cable 132 encircles the accessory 33 or 34 of the hitch bar 10 and the first end 134 of the cable 132 is passed through the fixed loop 152 to form a slip knot around the accessory 33 and 34 of the hitch bar 10, thereby attaching and securing the second end 136 of the cable lock 130 to the hitch bar 10. In this embodiment the accessory 33 and 34 of the hitch bar 10 can be any number of embodiments but, as illustrated in FIG. 19, necessarily must be configured that the second end 136 of the cable lock 130 can loop around the accessory 33 and 34 of the hitch bar 10 in a manner such that once the cable lock 130 is looped around and secured to the hitch bar 10 the cable lock 130 can only be removed from the hitch bar 10 by reversing the procedure for attaching it and cannot simply be slid off the hitch bar 10 in some manner.

Figure 18:
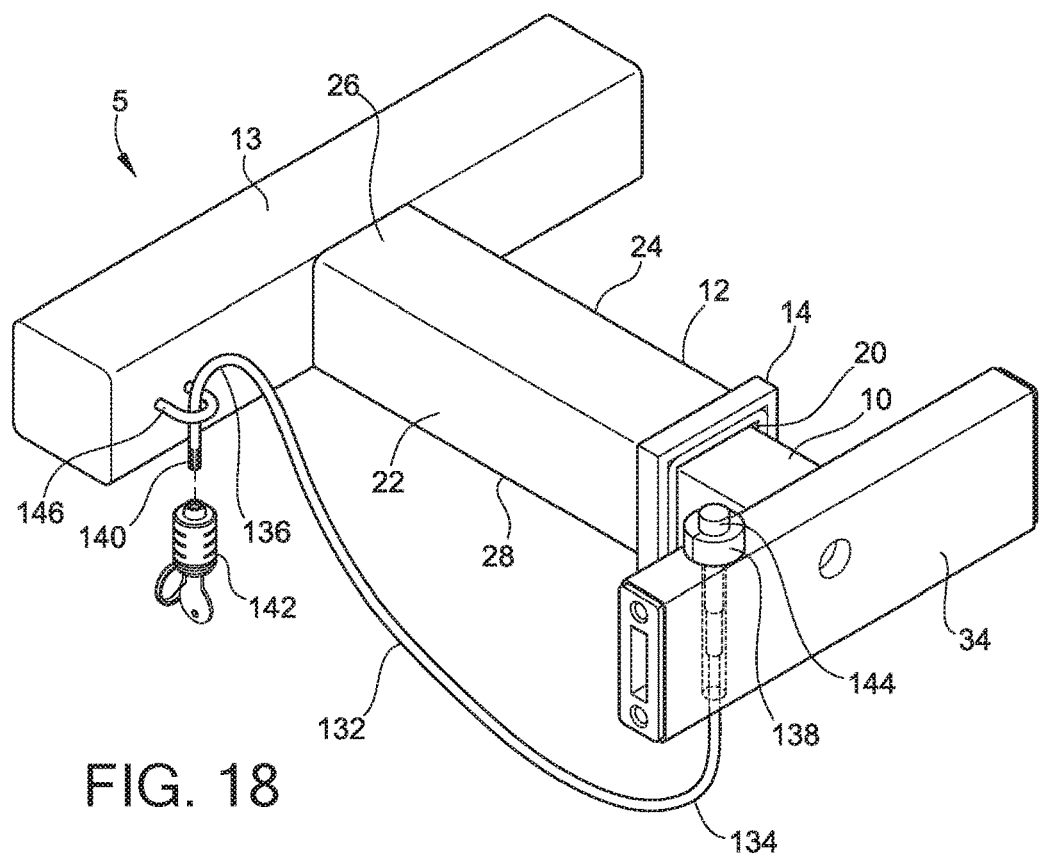
FIG. 18 is a front perspective view of an embodiment of the locking adjustable hitch assembly of the present invention, showing a reverse embodiment of the cable lock attached to the hitch receiver and the hitch bar with the releasable lock.

As illustrated in FIG. 19, the preferred embodiment of the cable lock 130 is the adjustable cable stop with lock, third embodiment of the first end, combined with the looping end, fourth embodiment of the second end. However, it should be understood that the different first end 134 and second end 136 embodiments for the cable lock 130 can be mixed and matched and with slight size modifications can be interchangeable, provided at least one end of the cable lock 130 has a lock receiving end 140 with a paired lock 142. For example, as illustrated in FIG. 18, the first end 134 is capable of attaching to the hitch bar 10 and the second end 136 is capable of attaching to the chain loop 146, provided the cable stop is larger in diameter than the cable receiving hole 148 and provided the lock 142 is larger in diameter than the chain loop 146.

Sixth Embodiment—Double End Cable Stop

Figure 31:
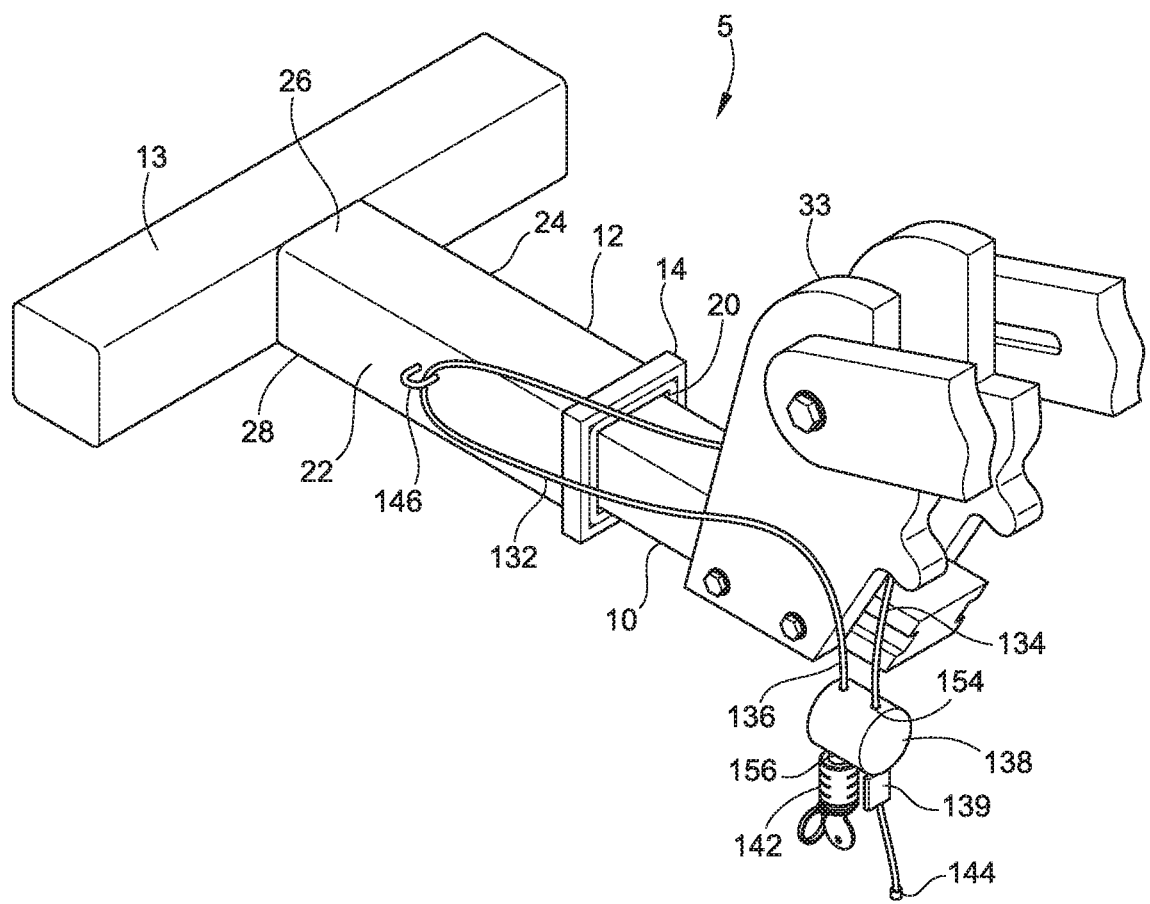
FIG. 31 is a partial front perspective view of an adjustable embodiment of the cable lock with both ends of the cable passing through a cable stop.

As illustrated in FIG. 31, another embodiment of the cable lock 130 includes a cable 132 with a first end 134 and a second end 136, an end cable stop 144 attached to the first end 134 of the cable 132 and a lock receiving end 140 attached to the second end 136 of the cable 132. The cable lock 130 also includes a cable stop 138 positioned along the first end 134 of the cable 132. The cable stop 138 has at least two channels 154 and 156 through which the second end 136 of the cable 132 can pass: the first channel 154 positioned along the first end 134 of the cable 132 and the second channel 156 for receiving the second end 136 of the cable 132 such that the lock receiving end 140 passes through the second channel 156 and the lock 142 can couple to the lock receiving end 140. As illustrated in FIG. 31, in one embodiment, the second end 136 of the cable 132 may be first received through the first channel 154 of the cable stop 138, then received through the chain loop 146, passed around the hitch bar 10 such that the cable 132 loops around the hitch bar 10, then passed through the second channel 156 of the chain stop 138, and the lock 142 is then coupled to the lock receiving end 140. In this embodiment, both ends of the chain lock 130 attach to the cable stop 138 and the cable 132 loops through the chain loop 146 and around the hitch bar 10 to secure and releasably lock the trailer hitch bar to the trailer hitch receiver. In this embodiment, as is illustrated in FIG. 31, the hitch bar 10 includes an accessory 33 and 34 such that when the cable lock 130 loops around the hitch bar 10, the cable 132 cannot be removed from around the hitch bar 10 unless the process of looping is reversed. For example, the cable 132 could not simply be slid off an exposed end of the hitch bar 10. The cable stop 138 is larger in diameter than the chain loop 146.

Seventh Embodiment—Adjustable Double End Cable Stop

As illustrated in FIGS. 21 and 22, in one embodiment, the first end 134 of the cable 132 may be adjustable such that if the cable 132 has additional slack when attached to the system 5, the slack can be taken in through the cable stop 138 to shorten the length of the cable 132 between the first channel 154 of the cable stop 138 and the lock receiving end 140. To accomplish the locking adjustability of the cable 132, the cable lock 130 will contain the same components as the above double end cable stop, sixth embodiment, and include at least one cable grip 139. As illustrated in FIG. 21, in one embodiment, the cable grip 139 has a single gripping channel (not labeled) that the cable 132 passes through, a mechanism (not pictured) for gripping and locking the cable in place in a single direction of motion, and a release 150 for unlocking the cable 132 in the cable grip 139 to allow the cable 132 to move in two directions of motion. As illustrated in FIG. 22, in one embodiment, the cable grip 139 has two gripping channels (not labeled) where the cable 132 passed through the first gripping channel in one direction, exits the first gripping channel 154 of the cable stop 138 in the same direction, loops, and passes through the second gripping channel 156 of the cable stop 138 in the opposite direction. As illustrated in FIGS. 21 and 22, in one embodiment, the cable grip 139 may be a separate component from the cable stop 138. The cable grip 139 may be placed on the cable 132 between the end cable stop 144 and the first channel 154 of the cable stop 138. The cable grip 139 will have a diameter larger than the first channel 154 of the cable stop 138 through which the cable 132 passes. When attached to the system 5, the cable grip 139 is adjacent to the first channel 154 of the cable stop 138 and secures the length of cable 132 between the cable stop 138 and the lock receiving end 140 to a set position. As illustrated in FIGS. 24 and 25, in one embodiment, the cable stop 138 may include a cable grip 139 attached to the first channel 154 of the cable stop 138 such that they are one component. In embodiments where the cable stop 138 includes the cable grip 139, it should be understood that the cable grip 139 could be attached to either side of the cable stop 138 along the cable 132 and could be either a single channel cable grip or a double channel cable grip.

To increase the length of cable 132 between the cable stop 138 and the end cable bolt 140, the cable grip 139 has a release 150 and 150b for each gripping channel. Each release 150 and 150b either be keyed or not keyed. When the release 150 or 150b is activated, the cable 132 will be able to freely move in two directions of motion. When the release is deactivated, the cable 132 will only be adjustable in one direction of motion, such that the length of cable 132 between the cable stop 138 and the lock receiving end 140 is decreased. The adjustability allows the use of a single cable lock for a variety of hitch bar 10 positions in the vehicle receiver 12.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention and is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. An adjustable trailer hitch system with a cable lock comprising:
   a. a vehicle trailer hitch receiver, comprising a receiver opening and a chain loop;
   b. an adjustable hitch bar for releasable attachment to the trailer hitch receiver, wherein the hitch bar is adapted to be slidably received in the receiver opening, wherein the hitch bar comprises a distal end, a proximal end, parallel side walls, a top wall and a bottom wall;
   c. an anti-wobble device to secure and stabilize the hitch bar within the vehicle receiver; and
   d. a cable lock to secure and lock the adjustable hitch bar to the trailer hitch receiver, comprising a cable with a first end and a second end, a cable stop, an end cable stop, and a cable grip, wherein the first end is adapted to releasably attach to the chain loop, further wherein the second end is adapted to releasably attach to the hitch bar, wherein the cable stop is position on the cable along the first end of the cable, further wherein the cable stop is at least greater in diameter than the chain loop, wherein the end cable stop is attached to the first end of the cable, wherein the cable grip is moveably positioned on the cable adjacent the cable stop, wherein the cable grip includes at least one gripping channel through which the cable passes, a mechanism for gripping and locking the cable in place in one direction of motion, and a release for unlocking the cable in the cable grip to allow the cable to move in two directions of motion, wherein the end cable stop is at least greater in diameter than the at least one gripping channel, wherein the cable lock passes through the chain loop such that the cable stop is positioned adjacent the chain loop and prevents the first end of the cable from pulling through the chain loop;
wherein the hitch bar extends along a length of the hitch bar such that the distal end of the hitch bar is positioned an adjustable distance from the receiver as desired, and wherein the anti-wobble device releasably secures the hitch bar as positioned in the receiver.

2. The system of claim 1, wherein the at least one gripping channel of the cable grip includes two gripping channels wherein the cable passes through a first gripping channel of the two gripping channels in one direction, exits the first gripping channel in the same direction, loops, and passes through a second gripping channel of the two gripping channels in the opposite direction.

3. The system of claim 1, wherein the release is a keyless release.

4. The system of claim 1, wherein the release is a keyed release.

5. The system of claim 1, wherein the cable grip is affixed to the cable stop.

6. The system of claim 1, wherein the end cable stop includes a lock receiving end attached to the first end of the cable and a lock removably coupled to the lock receiving end, therein the lock portion of the end cable stop is at least greater in diameter than a channel on the cable stop through which the cable passes.

7. The system of claim 6, wherein the lock receiving end is a cable locking bolt and the lock is a lock adapted to attach to the cable locking bolt.

8. The system of claim 6, wherein the lock receiving end is a pin lock end and the lock is a lock adapted to attach to the pin lock end.

9. The system of claim 6, wherein the lock receiving end is a fixed loop in the cable and the lock is a padlock.

10. The system of claim 1, wherein the hitch bar includes a cable receiving hole bore through the hitch bar near the proximal end; wherein the cable lock further comprises a lock receiving end attached to the second end of the cable; and a lock removably coupled to the lock receiving end, wherein the lock is at least greater in diameter than the cable receiving hole, further wherein the lock receiving end passes though the cable receiving hole and the lock is coupled to the lock receiving end such that the cable lock secures and releasably locks to the hitch bar.

11. The system of claim 10, wherein the lock receiving end is a cable locking bolt and the lock is a lock adapted to attach to the cable locking bolt.

12. The system of claim 10, wherein the lock receiving end is a pin lock end and the lock is a lock adapted to attach to the pin lock end.

13. The system of claim 10, wherein the lock receiving end is a fixed loop in the cable and the lock is a padlock.

14. The system of claim 1, wherein the second end of the cable forms a fixed loop, wherein the loop has a diameter great enough in size to allow the first end of the cable to pass through the fixed loop, further wherein the second end of the cable encircles the hitch bar and the first end of the cable passes through the fixed loop to form a slip knot around the hitch bar, securing the second end of the cable to the hitch bar.

15. An adjustable trailer hitch system with a looped cable lock comprising:
 a. a vehicle trailer hitch receiver, comprising a receiver opening and a chain loop;
 b. an adjustable hitch bar for releasable attachment to the trailer hitch receiver, wherein the hitch bar is adapted to be slidably received in the receiver opening, wherein the hitch bar comprises a distal end, a proximal end, parallel side walls, a top wall, a bottom wall and an accessory attached to the proximal end;
 c. an anti-wobble device to secure and stabilize the hitch bar within the vehicle receiver; and
 d. a cable lock to secure and lock the adjustable hitch bar to the trailer hitch receiver, comprising a cable with a first end and a second end; a cable stop positioned on the cable, the cable stop having at least two channels through which the second end of the cable can pass; an end cable stop attached to the first end of the cable, the end cable stop being at least greater in diameter than a first channel of the at least two channels of the cable stop; a lock receiving end attached to the second end of the cable, wherein the cable stop is positioned on the cable between the first end of the cable and the second end of the cable; and a lock to removably couple to the lock receiving end, the lock being at least greater in diameter than the bolt receiving hole;

wherein the hitch bar extends along a length of the hitch bar such that the distal end of the hitch bar is positioned an adjustable distance from the receiver as desired, and wherein the anti-wobble device releasably secures the hitch bar as positioned in the receiver, further wherein the second end of the cable is passed through the first channel of the cable stop, then passed through the chain loop, passed around the hitch bar such that the cable loops around the hitch bar, is then passed through a second channel of the at least two channels of the cable stop, and the lock is coupled to the lock receiving end such that both ends of the cable releasably attach to the cable stop and the cable lock secures and releasably locks the hitch bar to the trailer hitch receiver.

16. The system of claim 15, wherein the cable lock further comprises a cable grip moveably positioned on the cable adjacent a distal end of the cable stop, wherein the cable extends through the cable grip and through the cable stop, the cable grip comprising at least one gripping channel through which the cable passes; a mechanism for gripping and locking the cable in place in one direction of motion; and a release for unlocking the cable in the cable grip to allow the cable to move in two directions of motion, wherein the end cable stop is at least greater in diameter than the at least one gripping channel.

17. The system of claim 15, wherein the cable lock further comprises a cable grip moveably positioned on the cable adjacent a distal end of the cable stop, wherein the cable extends through the cable grip and through the cable stop, the cable grip comprising two gripping channels through which the cable passes; a mechanism for gripping and locking the cable in place in one direction of motion; and a release for unlocking the cable in the cable grip to allow the cable to move in two directions of motion, wherein the end cable stop is at least greater in diameter than the gripping channels, wherein the cable passes through a first gripping channel of the two gripping channels in one direction, exits the first gripping channel in the same direction, loops, and passes through a second gripping channel of the two gripping channels in the opposite direction.

18. The system of claim 15, wherein the cable stop includes a cable grip attached to the first channel of the cable stop, wherein the cable extends through the cable grip and through the cable stop, the cable grip comprising at least one gripping channel through which the cable passes; a mechanism for gripping and locking the cable in place in one direction of motion; and a release for unlocking the cable in the cable grip to allow the cable to move in two directions of motion.

* * * * *